United States Patent
Harashina et al.

(10) Patent No.: US 7,183,340 B2
(45) Date of Patent: Feb. 27, 2007

(54) POLYACETAL RESIN COMPOSITION AND PROCESS FOR PRODUCING SAME

(75) Inventors: Hatsuhiko Harashina, Fuji (JP); Hayato Kurita, Fuji (JP)

(73) Assignee: Polyplastics Co., Ltd., Tokyo (JP)

(*) Notice: Subject to any disclaimer, the term of this patent is extended or adjusted under 35 U.S.C. 154(b) by 0 days.

(21) Appl. No.: 10/538,121

(22) PCT Filed: Dec. 24, 2003

(86) PCT No.: PCT/JP03/16527

§ 371 (c)(1),
(2), (4) Date: Jun. 7, 2005

(87) PCT Pub. No.: WO2004/058884

PCT Pub. Date: Jul. 15, 2004

(65) Prior Publication Data

US 2006/0052492 A1    Mar. 9, 2006

(30) Foreign Application Priority Data

Dec. 26, 2002  (JP)  .............................. 2002-377588

(51) Int. Cl.
  *C08K 5/04*  (2006.01)
  *C08K 5/09*  (2006.01)
  *C08K 5/3492*  (2006.01)
(52) U.S. Cl. .................. 524/100; 524/94; 524/300; 524/359; 524/394; 524/404
(58) Field of Classification Search ............. 524/94, 524/100, 300, 359, 394, 404, 449
See application file for complete search history.

(56) References Cited

U.S. PATENT DOCUMENTS 4,526,921 A * 7/1985 Sakurai et al. .............. 524/405
4,843,115 A * 6/1989 Auerbach et al. ........... 524/100
6,673,405 B2 * 1/2004 Harashina .................. 428/35.7

FOREIGN PATENT DOCUMENTS

| JP | 10-67942 | 3/1998 |
| JP | 2000-119485 | 4/2000 |
| JP | 2002-201334 | 7/2002 |
| JP | 2004-43610 | 2/2004 |

* cited by examiner

Primary Examiner—Kriellion Sanders
(74) Attorney, Agent, or Firm—Nixon & Vanderhye, P.C.

(57) ABSTRACT

About 0.001 to 5 parts by weight of an antioxidant and about 0.001 to 10 parts by weight of a guanamine compound having at least one unit represented by the following formula (1) or a salt thereof relative to 100 parts by weight of a polyacetal resin are mixed and constitute a resin composition. The resin composition may further comprise a processing stabilizer, a heat stabilizer, a weather-resistant stabilizer, a coloring agent, a gloss control agent, an impact resistance improver, a slide improver, a filler, and/or the like.

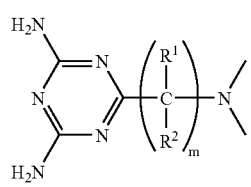

(1)

Wherein $R^1$ and $R^2$ are the same or different and each represents a hydrogen atom or an alkyl group, and "m" denotes an integer of not less than 2.

17 Claims, No Drawings

POLYACETAL RESIN COMPOSITION AND PROCESS FOR PRODUCING SAME

This application is the US national phase of international application PCT/JP2003/016527 filed 24 Dec. 2003 which designated the U.S. and claims benefit of JP 2002-377588, dated 26 Dec. 2002, the entire content of which is hereby incorporated by reference.

TECHNICAL FIELD

The present invention relates to a polyacetal resin composition being effectively inhibited from emitting (or generating) formaldehyde, to a process of producing the same, and to a polyacetal resin-shaped (or -molded) article formed from the resin composition.

BACKGROUND ART

A polyacetal resin is decomposed or resolved during a processing step such as extruding or molding, as a result deposits on a mold (mold deposit) are generated, and the polyacetal resin tends to be deteriorated in the moldability, the mechanical property and others. Formaldehyde generated by decomposition or resolution of a polyacetal resin is chemically active and adversely affects the heat resistance of resin. Moreover, when the resin is used as electrical or electronic parts, formaldehyde generated from the resin causes corrosion of metal contacts or their discoloration due to organic deposits, resulting in contact failure. Furthermore, formaldehyde as such contaminates the working environment for parts assembling and the ecology in the environment for using end products. The polyacetal resin is therefore required to have a high heat stability, and inhibit generation of formaldehyde during the processing step or from a shaped article of the resin.

In order to stabilize a polyacetal resin, therefore, an antioxidant or other stabilizer (e.g., a nitrogen-containing compound, and an alkali metal or alkaline earth metal compound) has been used. In particular, it is known that an aminotriazine compound such as melamine, guanamine or acetoguanamine is effective as the nitrogen-containing compound. However, since such an aminotriazine compound has a low molecular weight and also has a low compatibility with a polyacetal resin, adhesion to a mold (mold deposit) or bleeding from a shaped article (blooming) is generated along with mold processing. As a result, the aminotriazine compound brings about deterioration of formability (or moldability), defective external appearance of the shaped article, and stain due to the bled matter.

To improve such defects, a method of modifying a resin with a triazine compound increased a molecular weight thereof (e.g., a melamine-formaldehyde resin), or a salt of a triazine compound with an acidic compound (e.g., melamine cyanurate, and guanamine cyanurate), or others is being attempted. The stabilization action of the polyacetal in these modified products, however, drastically decreases compared with that in non-modified products. In addition, due to insolubility and infusibility, these products usually slightly cause the bleeding from a shaped article thereof and meanwhile deteriorate an appearance property of the shaped article due to irregularity in the surface thereof.

It is therefore an object of the present invention to provide a polyacetal resin composition which is excellent in inhibition of stabilizer bleeding, shaping processability (or moldability) and an appearance property in a surface of a shaped article formed from the composition and in which generation of formaldehyde is restrained, and a process for producing the same.

It is another object of the present invention to provide a polyacetal resin-shaped article which is excellent in an appearance property of the surface and in which generation of formaldehyde is restrained.

DISCLOSURE OF THE INVENTION

The inventors of the present invention made intensive studies on a series of aminotriazine compounds regarding a stabilizer for a polyacetal resin to achieve the above objects and finally found that a combination use of an antioxidant and a specific guanamine compound improves shaping processability (or moldability) of the resin and an appearance property in a surface of a shaped article therefrom, and inhibits formaldehyde generation from the shaped article. The present invention was accomplished based on the above findings.

That is, the polyacetal resin composition of the present invention comprises a polyacetal resin, an antioxidant, and a guanamine compound having at least one unit represented by the following formula (1):

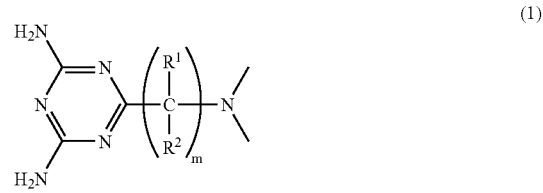

wherein $R^1$ and $R^2$ are the same or different and each represents a hydrogen atom or an alkyl group; and "m" denotes an integer of not less than 2, or a salt of the guanamine compound. The guanamine compound may comprise a compound represented by the following formula (2):

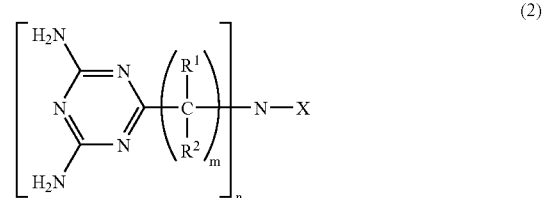

wherein the unit —N—X represents an ammonia or amine residue, "n" denotes an integer of 1 to 6, and $R^1$, $R^2$ and "m" have the same meanings defined above.

The guanamine compound may have, for example, an imidazole residue.

The antioxidant may comprise a hindered phenol-series compound and/or a hindered amine-series compound. The polyacetal resin composition may comprise 0.001 to 5 parts by weight of the antioxidant and 0.001 to 10 parts by weight of the guanamine compound relative to 100 parts by weight of the polyacetal resin. The resin composition may further comprise at least one member selected from the group consisting of a processing stabilizer and a heat stabilizer. The processing stabilizer may comprise at least one member selected from the group consisting of a long-chain fatty acid or a derivative thereof, water and/or an alcohol, an organosiloxane, a fluorine-containing compound and a wax, and the heat stabilizer may comprise at least one member selected from the group consisting of a basic nitrogen-containing compound [for example, biurea, allantoin or a metal salt thereof, a carboxylic acid hydrazide (e.g., an aliphatic or aromatic carboxylic acid hydrazide, and a resin master batch containing the carboxylic acid hydrazide) and a polyamide resin], a metal salt of an organic carboxylic acid, an alkali or alkaline earth metal compound, a hydrotalcite, a zeolite and an acidic compound (e.g., a boric acid compound, a nitrogen-containing cyclic compound having a hydroxyl group, a carboxyl group-containing compound, a (poly)phenol, and an aminocarboxylic acid). The proportions of the processing stabilizer and the heat stabilizer are about 0.01 to 5 parts by weight and about 0.001 to 5 parts by weight, respectively, relative to 100 parts by weight of the polyacetal resin. The resin composition may further comprise at least one additive selected from the group consisting of a weather (light)-resistant stabilizer (e.g., a benzotriazole-series compound, a benzophenone-series compound, an aromatic benzoate-series compound, a cyanoacrylate-series compound, an oxalic anilide-series compound, and a hindered amine-series compound), a coloring agent (e.g., a carbon black), a gloss control agent, an impact resistance improver, an agent for improving sliding property, and a filler.

The present invention also includes a process for producing a polyacetal resin composition which comprises mixing a polyacetal resin, an antioxidant and the guanamine compound or the salt thereof; a polyacetal resin-shaped article formed from the polyacetal resin composition; and a process for producing a polyacetal resin-shaped article, which comprises molding the polyacetal resin composition. When the shaped article is maintained in a closed space for 24 hours at a temperature of 80° C., the amount of formaldehyde generated (or emitted) from the article may be not more than 1.5 µg per 1 cm² of surface area of the article. Moreover, when the shaped article is maintained in a closed space for 3 hours at a temperature of 60° C. under a saturated humidity, the amount of formaldehyde generated from the article may be not more than 2.5 µg per 1 cm² of surface area of the article.

Further, the shaped article may be an automotive part, an electric and/or electronic device part, an architectural and/or pipeline part, a household utensil and/or cosmetic article part, a medical device part, and a photographic part.

DETAILED DESCRIPTION OF THE INVENTION

The resin composition of the present invention comprises a polyacetal resin, an antioxidant, and a specific guanamine compound. Addition of the guanamine compound can remarkably improve processing stability of the polyacetal resin and inhibit generation of formaldehyde.

[Guanamine Compound or Salt Thereof]

The guanamine compound has at least one unit represented by the following formula (1):

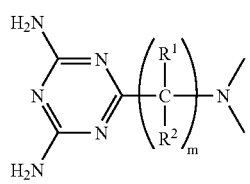

(1)

wherein $R^1$ and $R^2$ are the same or different and each represents a hydrogen atom or an alkyl group; and "m" denotes an integer of not less than 2.

In the formula (1), the alkyl group represented by $R^1$ and $R^2$ may include an alkyl group such as methyl, ethyl, propyl, isopropyl, n-butyl, or t-butyl group. Among these alkyl groups, a $C_{1-6}$alkyl group (e.g., a $C_{1-4}$alkyl group) is preferred. As $R^1$ and $R^2$, in particular, a hydrogen atom or methyl group is preferred.

The number "m" is preferably 2 to 4, and more preferably 2 or 3. In view of capability of manufacturing by using (meth)acrylonitrile which is easily obtainable as a raw material, it is preferred that "m" is 2. Incidentally, in the case where m is 2, a guanamine compound obtained by using (meth)acrylonitrile has a unit represented by the following formula:

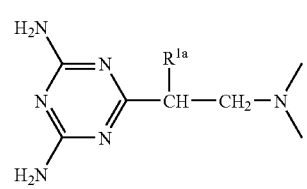

wherein $R^{1a}$ represents a hydrogen atom or methyl group.

The guanamine compound having such a unit (1) includes, for example, a compound represented by the following formula (2), and others.

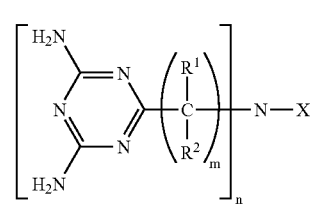

(2)

Wherein the unit —N—X represents an ammonia or amine residue, "n" denotes an integer of 1 to 6, and $R^1$, $R^2$ and "m" have the same meaning defined above.

The unit —N—X is a residue derived from ammonia or an amine (a primary and secondary amine) eliminated at least one active hydrogen atom (e.g., a hydrogen atom in amino group or imino group) therefrom.

An amine (HN—X) capable of forming the unit —N—X is not particularly limited to a specific one as long as the amine has at least one active hydrogen atom (amino group or imino group), and examples of the amine may include various primary or secondary amines (a cyclic or non-cyclic amine, a cyclic or non-cyclic urea compound, an amide compound, an imide compound, and a hydrazine compound).

The non-cyclic amine may include an aliphatic amine [for example, an alkylamine (e.g., a mono- or di$C_{1-6}$alkylamine such as methylamine, dimethylamine, ethylamine or diethylamine); a hydroxyalkylamine such as 2-hydroxyethylamine or 3-hydroxypropylamine (e.g., a hydroxymono- or di$C_{1-6}$alkylamine); and a (poly)alkylenepolyamine such as ethylenediamine, propylenediamine, tetramethylenediamine, hexamethylenediamine, diethylenetriamine or triethylenetetramine (e.g., a (poly)$C_{1-6}$alkylene-di- to tetramine)], an alicyclic amine [for example, an aminocycloalkane such as cyclohexylamine or diaminocyclohexane (e.g., a mono- to triamino$C_{5-8}$cycloalkane); and a diamine corresponding to a dialkylcycloalkane such as a hydrogenated xylylenediamine]; an aromatic amine (e.g., an aniline compound such as aniline, toluidine or diaminobenzene; and a diamine corresponding to a dialkylbenzene such as xylylenediamine); and others.

Examples of the cyclic amine may include a piperidine compound (e.g., piperidine; and an alkylpiperidine such as pipecoline), a piperazine compound (e.g., piperazine; an alkyl- or hydroxyalkyl-substituted piperazine such as 2,5-dimethylpiperazine or hydroxyethylpiperazine; and an N-alkylpiperazine such as N-methylpiperazine), a morpholine compound (e.g., morpholine; and an alkyl-substituted morpholine such as 2-methylmorpholine), a pyrrole compound (e.g., pyrrole, indole, and carbazole), an imidazole compound [for example, imidazole; a substituted imidazole (e.g., an imidazole compound having a substituent such as an alkyl group, an aryl group, an aminoalkyl group or a hydroxyalkyl group, for example, an alkylimidazole such as 2-methylimidazole, 2-undecylimidazole, 2-heptadecylimidazole or 2-ethyl-4-methylimidazole (e.g., a mono- or di$C_{1-20}$alkylimidazole); an arylimidazole such as 2-phenylimidazole or 2-phenyl-4-methylimidazole (e.g., a $C_{6-20}$arylimidazole); an aminoalkylimidazole such as 1-aminoethylimidazole or 1-aminoethyl-2-methylimidazole (e.g., an amino$C_{1-6}$alkyl-imidazole); and a hydroxyalkylimidazole such as 2-hydroxymethylimidazole, 2-phenyl-4-methyl-5-hydroxymethylimidazole or 2-phenyl-4,5-bis(hydroxymethyl)imidazole (e.g., a hydroxy$C_{1-6}$alkyl-imidazole)); and a benzimidazole]; and an amino group-containing triazine compound such as melamine.

The non-cyclic urea compound (or non-cyclic compound having a urea unit) may include urea, an N-substituted urea having a substituent such as an alkyl group at N-position, a non-cyclic urea condensate [for example, a polymer of urea (a dimer such as biuret, biurea or IB nitrogen), and a condensate of urea with an aldehyde compound (e.g., methylene diurea, and ureaform)], and others.

The cyclic urea compound (or cyclic compound having a urea unit) may include a compound having at least one urea unit (—NHCONH—) as a constituent unit of a ring thereof, for example, an alkyleneurea [e.g., a $C_{1-10}$alkyleneurea such as methyleneurea, ethyleneurea, crotonylideneurea (CDU), propyleneurea, butyleneurea, 4,5-bis(hydroxymethyl)ethyleneurea or 4,5-dimethoxyethyleneurea (preferably, a $C_{1-6}$alkyleneurea); a crosslinked alkyleneurea such as acetyleneurea (glycoluril); and an urone], an alkenyleneurea (e.g., a $C_{2-10}$alkenyleneurea such as vinyleneurea or cytosine), an aryleneurea (e.g., imesatin), a ureide of a dicarboxylic acid [for example, a triazone compound, a parabanic acid compound (e.g., parabanic acid, and dimethylparabanic acid), a barbituric acid compound (e.g., barbituric acid, and 5,5-diethylbarbituric acid), dilituric acid, a dialuric acid compound (e.g., dialuric acid), an alloxan compound (e.g., alloxan, and alloxanic acid), an isocyanuric acid compound (e.g., isocyanuric acid, and an N-substituted isocyanuric acid), and uramil], a ureide of a β-aldehydic acid [for example, anuracil compound (e.g., uracil, 5-methyluracil (thymine), and dihydrouracil)], urazole, and benzoylene urea], a ureide of a α-hydroxy acid [e.g., a hydantoin compound such as hydantoin; an alkylhydantoin such as 5-methylhydantoin, 5,5-dimethylhydantoin or 5-isopropylhydantoin (e.g., a mono- or di$C_{1-6}$alkylhydantoin); an arylhydantoin such as 5-phenylhydantoin (e.g., a $C_{6-10}$arylhydantoin); and a diureide having a hydantoin backbone such as 1,1,-methylenebis(5,5-dimethylhydantoin) or allantoin], a uric acid compound [e.g., uric acid, an alkyl-substituted uric acid (a $C_{1-4}$alkyluric acid such as 3-methyluric acid), and pseudouric acid], a diurea such as p-urazine, a diureide of a dicarboxylic acid (e.g., alloxantin, and purpuric acid), or a derivative thereof.

The amide compound may include, for example, an aliphatic amide such as formamide, acetamide or malonamide; an aromatic amide such as benzamide or isophthalic acid diamide; and a heterocyclic amide such as α-pyrrolidone, ε-caprolactam or glycine anhydride), and others. Examples of the imide compound may include an aliphatic imide compound such as succinimide or maleimide; and an aromatic imide compound such as phthalimide, pyromellitimide or trimellitimide. The hydrazine compound may include, for example, a hydrazone compound such as hydrazine or dimethylhydrazone; an aliphatic hydrazide such as adipic dihydrazide; and an aromatic hydrazide such as phthalic dihydrazide.

Among the amines or ammonia, the aliphatic amine, the cyclic amine (e.g., the piperazine compound, the morpholine compound, and the imidazole compound), the cyclic urea compound (e.g., the alkyleneurea compound, the isocyanuric acid compound, and the hydantoin compound), and the imide compound are preferred.

The number "n" is preferably an integer of 1 to 4. The number "n" may be selected depending on the ammonia or amine residue (unit —N—X). For example, when the unit —N—X is an amino group (that is, an ammonia residue), the number "n" is 1 to 3, and when the unit is a (poly) alkylenepolyamine residue, "n" is 1 to 6. In the case where the unit is an imidazole residue, "n" is 1, and when the unit is an alkyleneurea residue, "n" is 1 to 4. When the unit is an isocyanuric acid residue, "n" is 1 to 3, and when the unit is a hydantoin residue, "n" is 1 to 2. In the case where the unit is an imide residue, "n" is 1 to 3, and when the unit is a piperazine residue, "n" is 1 to 2.

Typical examples of the guanamine compound may include a compound represented by the following formula (3) or (4):

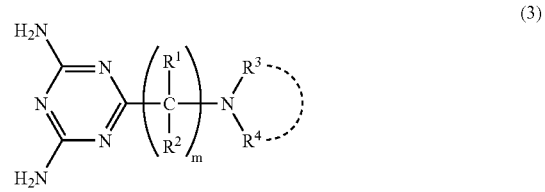

(3)

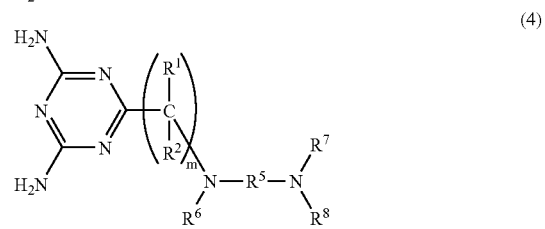

(4)

wherein $R^3$, $R^4$, and $R^6$, $R^7$ and $R^8$ are the same or different and each represents a hydrogen atom, an alkyl group, a cycloalkyl group, an aryl group, an aralkyl group, a carboxyalkyl group, an alkoxycarbonylalkyl group, an aryloxycarbonylalkyl group, or a guanamylalkyl group or cyanoalkyl group represented by the following formula (5a) or (5b):

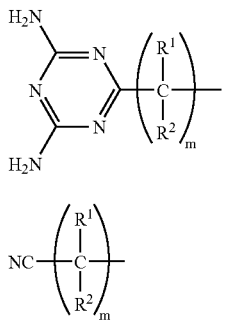

(5a)

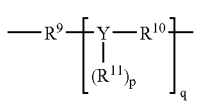

(5b)

$R^3$ and $R^4$ may bond together with an adjacent nitrogen atom to form a hetero ring; $R^5$ represents an alkylene group, a divalent alicyclic group, a divalent aromatic group, or a divalent group represented by the following group (6):

$$-R^9-\left[\begin{array}{c} Y-R^{10} \\ | \\ (R^{11})_p \end{array}\right]_q-$$ (6)

wherein $R^9$ and $R^{10}$ are the same or different and each represents an alkylene group; $R^{11}$ represents a hydrogen atom, a guanamylalkyl group of the formula (5a) or a cyanoalkyl group of the formula (5b); "Y" represents an oxygen atom or a nitrogen atom; "p" denotes 0 when "Y" is an oxygen atom and "p" denotes 1 when "Y" is a nitrogen atom; "q" denotes an integer of not less than 1; $R^1$, $R^2$ and "m" have the same meanings defined above.

The alkyl group represented by the $R^3$, $R^4$, and $R^6$, $R^7$ and $R^8$ may include the same alkyl group as that exemplified in the paragraph of the above-mentioned $R^1$ and $R^2$. Examples of the cycloalkyl group may include a $C_{5-8}$cycloalkyl group such as cyclohexyl group, and preferably a $C_{5-6}$cycloalkyl group. The aryl group may include a $C_{6-10}$aryl group such as phenyl or naphthyl group; an arylalkylaryl group such as biphenylyl group or 4-(2',2'-dimethyl-2'-phenylmethyl)phenyl group(e.g., a $C_{6-10}$aryl-$C_{1-6}$alkyl-$C_{6-10}$aryl group); and others. As the aralkyl group, there may be mentioned a $C_{6-10}$aryl-$C_{1-4}$alkyl group such as benzyl or phenethyl group, and others.

The carboxyalkyl group, alkoxycarbonylalkyl group, and aryloxycarbonylalkyl group may be represented by the following formula (5c):

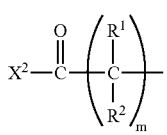

(5c)

wherein $X^2$ represents a hydroxyl group, an alkoxy group, or an aryloxy group, and $R^1$, $R^2$ and "m" have the same meanings defined above.

In the formula (5c), the alkoxy group represented by $X^2$ may include a $C_{1-6}$alkoxy group such as methoxy, ethoxy, propoxy, isopropoxy, butoxy or t-butoxy group (preferably a $C_{1-4}$alkoxy group), and others. Examples of the aryloxy group may include a $C_{6-14}$aryloxy group such as phenoxy group or naphthoxy group (preferably a $C_{6-10}$aryloxy group). The halogen atom includes a fluorine atom, a chlorine atom, a bromine atom and an iodine atom (particularly, a chlorine atom and a bromine atom).

Such a carboxyalkyl group may include, for example, a carboxy$C_{2-5}$alkyl group such as carboxyethyl group or carboxypropyl group (e.g., a carboxy$C_{2-4}$alkyl group). Moreover, examples of the alkoxycarbonylalkyl group may include a $C_{2-6}$alkoxycarbonyl-$C_{2-4}$alkyl group such as methoxycarbonylethyl group, ethoxycarbonylethyl group or ethoxycarbonylpropyl group. The aryloxycarbonylalkyl group may include a $C_{6-10}$aryloxy-carbonyl-$C_{2-4}$alkyl group such as phenoxycarbonylethyl group or phenoxycarbonylpropyl group.

As the heterocycle formed by $R^3$, $R^4$ and the adjacent nitrogen atom, there may be mentioned, for example, a 5- to 8-membered heterocycle such as pyrrolidine, pyrroline, pyrrole, imidazolidine, pyrazolidine, imidazoline, pyrazoline, imidazole, pyrazole, piperidine, morpholine, piperazine, 1H, 3H, 5H-1,3-diazine, 1H, 3H-1,3-diazine, 1H-1,3-diazine, 1H, 3H, 5H-1,3,5-triazine, 1H, 3H-1,3,5-triazine or 1H-1,3,5-triazine (e.g., a 5- or 6-membered heterocycle); and a condensed heterocycle such as indoline, isoindoline, indole, isoindole, 1H-indazole, purine, or carbazole. The heterocycle may have other hetero atom(s) (an oxygen atom, a sulfur atom, a nitrogen atom) in addition to the nitrogen atom. Moreover, the heterocycle may have, for example, one or two or more substituent(s) such as an alkyl group (for example, a $C_{1-16}$alkyl group such as methyl, ethyl, butyl, hexyl, octyl, decyl or undecyl group, preferably a $C_{1-2}$alkyl group, and particularly a $C_{1-6}$alkyl group), a hydroxyl group, an oxo group (=O), a cyano group, or an amino group.

The alkylene group represented by $R^5$ may include a $C_{1-6}$alkylene group such as methylene, ethylene, propylene or tetramethylene group, preferably a $C_{1-4}$alkylene group, and the like. The divalent (or bivalent) alicyclic group may include a cycloalkylene group (e.g., a $C_{5-8}$cycloalkylene group such as cyclohexylene group); and a divalent group represented by $-R^a-A^1-R^b-$ or $-A^2-R^c-A^3-$ [in the formula, $R^a$ and $R^b$ are the same or different and each represents a $C_{1-6}$alkylene (e.g., a $C_{1-4}$alkylene) group; $R^c$ represents a linear or branched $C_{1-6}$alkylene (e.g., a $C_{1-4}$alkylene) group; and $A^1$ to $A^3$ are the same or different and each represents a $C_{5-8}$cycloalkylene (e.g., a $C_{5-6}$cycloalkylene) group]. The divalent (or bivalent) aromatic group may include an arylene group (for example, a $C_{6-10}$arylene group such as phenylene or naphthylene group); a divalent group represented by $-R^a-Ar-R^b-$ or $-Ar-R^c-Ar-$ (in the formula, Ar represents a $C_{6-10}$arylene group; and $R^a$, $R^b$ and $R^c$ have the same meanings defined above), and others.

The alkylene group represented by $R^9$ and $R^{10}$ may include the same alkylene group as that exemplified in the paragraph of the above-mentioned $R^5$.

The number "q" is preferably an integer of 1 to 6, and more preferably an integer of 1 to 4 (in particular 1 or 2).

In the above formula (4), $R^6$, $R^7$ and $R^8$ are usually a guanamylalkyl group represented by the formula (5a). In the above formula (6), $R^9$ and $R^{10}$ are usually a $C_{2-4}$alkylene group, $R^{11}$ is usually a guanamylalkyl group represented by the formula (5a), and "Y" is usually a nitrogen atom.

The guanamine compound may be produced by the following method (I) or (II):

(I) a method of, in the presence of a basic catalyst, allowing a nitrile (cyanoalkylated compound) having a unit represented by the following formula (7) (e.g., a nitrile represented by the following formula (8)):

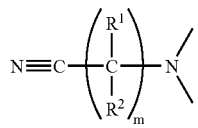  (7)

wherein $R^1$, $R^2$, and "m" have the same meanings defined above to react with a dicyandiamide or biguanide compound [for example, biguanide; a salt of biguanide (e.g., a salt of an inorganic acid such as a hydrochloride, a sulfate or a nitrate; and a metal salt); biguanyl or a salt thereof (e.g., a salt of an inorganic acid such as a hydrochloride, a sulfate or a nitrate; and a metal salt)]; or (II) a method of allowing a derivative of the nitrile (cyanoalkylated compound) [for example, a derivative in which a cyano group of the nitrile (cyanoalkylated compound) is replaced with a carboxyl group, an alkoxycarbonyl group, an aryloxycarbonyl group, a haloformyl group or other group, that is, a carboxyalkylated compound, an alkoxycarbonylalkylated compound, an aryloxycarbonylated compound, a haloformylalkylated compound, or others] to react with a biguanide compound (the biguanide compound exemplified above).

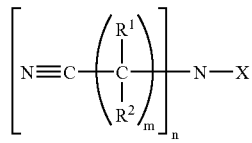  (8)

In the formula, $R^1$, $R^2$, "m", "n" and the unit —N—X have the same meanings defined above.

The cyanoalkylated compound may be produced by a conventional method, for example, a reaction of a corresponding cyanoalkene compound (e.g., (meth)acrylonitrile) with an amine having an active hydrogen atom or ammonia (hereinafter, the reaction is sometimes simply referred to as "reaction A").

The details regarding the reaction A may be referred to, for example, Organic Reactions, Vol. 5, 7$^{th}$ ed., p79, John Wiley & Sons, Inc. (1967), Encyclopedia of Chemical Technology Vol. 6, 2$^{nd}$ ed., p 634, Nippon Kagaku Kaishi, Vol. 90, p 704 (1969), Japanese Patent Publication No. 27869/1968 (JP-43-27869B), Japanese Patent Application Laid-Open No. 22422/1973 (JP-48-22422A), Japanese Patent Publication Nos. 6626/1968 (JP-43-6626B) and 36391/1972 (JP-47-36391B), Japanese Patent Application Laid-Open Nos. 142817/1975 (JP-50-142817A), 4379/1980 (JP-55-4379A), 21664/1992 (JP-4-21664A), 80112/1999 (JP-11-80112A), 180963/1999 (JP-11-180963A) and 154181/2000 (JP-2000-154181A) and U.S. Pat. No. 3,235,553 specification, and methods described in related documents cited in these documents. Also, 2-substituted guanamine compound obtained from a variety of nitriles (e.g., cyanoethylated compound) described in the documents relevant to the reaction A may be used similar to the guanamine compound.

The reaction A may be carried out in the absence or presence of a solvent. The solvent may include water, an alcoholic solvent (e.g., methanol, ethanol, propanol, isopropanol, butanol, t-butanol, ethylene glycol, diethylene glycol, triethylene glycol, and glycerin), an ether-series solvent (e.g., a dialkyl ether such as dimethyl ether or diethyl ether; and an alkyl ether of an alkylene glycol such as an ethylene glycol monoalkyl ether, an ethylene glycol dialkyl ether, a diethylene glycol monoalkyl ether, a diethylene glycol dialkyl ether, a polyethylene glycol monoalkyl ether or a polyethylene glycol dialkyl ether), a hydrocarbon (e.g., an alicyclic hydrocarbon such as decalin), an aromatic solvent (e.g., benzene, toluene, xylene, pyridine, and nitrobenzene), a halogen-series solvent (e.g., methylene chloride, chloroform, ethyl chloride, ethylene chloride, chlorobenzene, and chloronaphthalene), an aprotic polar solvent [for example, a cyclic ether such as dioxane; a ketone such as acetone or methyl ethyl ketone, and a nitrile such as acetonitrile, propionitrile or benzonitrile; a sulfoxide such as dimethyl sulfoxide; an amide compound such as dimethylformamide or dimethylacetamide; sulfolane, N-methylpyrrolidone, and hexamethylphosphamide], and others.

In the reaction A, the cyanoalkyl group such as 2-cyanoethyl group can be introduced depending on the number of an active hydrogen atom in the amine or ammonia. The introducing amount of the cyanoalkyl group may be adjusted based on the proportion of the nitrile as a raw material relative to the amine or ammonia, the reaction condition, and other conditions. The proportion of the nitrile as a raw material relative to the amine or ammonia is not particularly limited to a specific one, and for example, the former (mol)/the active hydrogen equivalent of the latter is about 0.5/1 to 2/1, preferably about 0.7/1 to 1.5/1, and more preferably about 0.8/1 to 1.2/1.

The guanamine compound may be obtained by (I) a reaction of the cyanoalkylated compound (nitrile precursor) and the dicyandiamide or biguanide compound in the presence of a basic catalyst (hereinafter, the reaction is sometimes simply referred to as "reaction B1") or (II) a reaction of the derivative of the cyanoalkylated compound and the biguanide compound (hereinafter, the reaction is sometimes simply referred to as "reaction B2"). The reactions B1 and B2 may be conducted in the presence of a solvent (e.g., the solvent exemplified in the paragraph of the reaction A).

The details regarding the reaction B1 may be referred to, for example, a method of allowing a dinitrile compound to react with a dicyandiamide in an alcoholic organic solvent in the presence of a basic catalyst under a high pressure (Japanese Patent Application Laid-Open No. 32664/1993 (JP-5-32664A)), a method of allowing a dinitrile compound to react with a dicyandiamide in an organic solvent in the presence of a basic catalyst (Japanese Patent Publication Nos. 8676/1969 (JP-44-8676B), 36391/1972 (JP-47-36391B) and 41120/1972 (JP-47-41120B), Japanese Patent Application Laid-Open No. 154181/2000 (JP-2000-154181A), and U.S. Pat. No. 2,901,464 specification), J. Chem. Soc. page 1252 (1952), Comprehensive Heterocyclic Chemistry II, Vol. 6, page 613, a method of allowing a nitrile compound to react with a biguanide compound in an alcoholic solvent in the presence of a basic catalyst (U.S. Pat. No. 2,777,848 specification), and methods described in related documents cited in these documents.

The basic catalyst used in the reaction B1 may include an inorganic base [for example, an alkali metal (e.g., metallic potassium, and metallic sodium), a metal hydroxide (e.g., an alkali metal hydroxide such as potassium hydroxide, sodium hydroxide or lithium hydroxide; an alkaline earth metal hydroxide such as magnesium hydroxide or calcium hydroxide; and a transition metal hydroxide such as copper hydroxide), a carbonate (e.g., an alkali metal carbonate such as potassium carbonate, sodium carbonate or lithium carbonate; an alkaline earth metal carbonate such as magnesium carbonate, calcium carbonate or barium carbonate; an alkali metal hydrogen carbonate such as potassium hydrogencarbonate, sodium hydrogen carbonate or lithium hydrogen carbonate), an alkoxide (an alkali metal alkoxide such as potassium methoxide, or sodium methoxide), an alkali metal salt of an organic carboxylic acid (e.g., sodium acetate), and an ammonia], and an organic base [for example, an alkali metal amide (e.g., potassium amide, and sodium amide), and an amine or ammonium compound (e.g., an alkylamine such as triethylamine; a tertiary arylamine such as N,N-dimethylaniline; a heterocyclic amine such as pyridine; and a quaternary ammonium hydroxide)].

The proportion of the basic catalyst is about 0.01 to 3 mol, preferably about 0.05 to 2 mol, and more preferably about 0.1 to 1.5 mol relative to 1 mol of the nitrile group of the nitrile as a raw material.

In the reaction B1, at least one nitrile group of the nitrile as a raw material can be transformed into a guanamine ring. The proportion of the nitrile relative to the dicyandiamide or biguanide compound may be selected from a wide range depending on an object product. The nitrile relative to the dicyandiamide and biguanide compound [the former/the latter (molar ratio)] is, for example, about 1/1 to 1/10, preferably about 1/1 to 1/6, and more preferably about 1/1 to 1/4 (e.g., about 1/1 to 1/2). In particular, it is preferred to use dicyandiamide about 1 to 1.3 times in mole as much as the nitrile group of the nitrile.

In the case of using the solvent in the reaction B1, the amount of the solvent is not particularly limited to a specific one, and for example, is about 10 to 1000 parts by weight (e.g., about 10 to 500 parts by weight), and preferably about 30 to 500 parts by weight relative to 100 parts by weight of the total amount of the nitrile as a raw material and the dicyandiamide.

In the reaction B1, the reaction temperature is not particularly limited to a specific one, and for example, may be selected from the range of about 0 to 200° C. (e.g., about 20 to 200° C.). Since the reaction rate is slow at a temperature not higher than a room temperature, usually the reaction temperature is preferably about 50 to 170° C. The reaction sufficiently proceeds under the atmospheric pressure. The reaction may be carried out under pressure (e.g., under a high pressure by using an autoclave).

The derivative of the cyanoalkylated compound used in the reaction B2 may be produced by a conventional method. For example, the carboxyalkylated compound may be produced by a hydrolysis reaction of the above-mentioned cyanoalkylated compound, or other methods. Moreover, from thus obtained carboxyalkylated compound, a derivative such as an alkoxycarbonylalkylated compound, an aryloxycarbonylalkylated compound or an acid halide (haloformylalkylated compound) may be also produced by a conventional method.

The methods for producing the derivative of the cyanoalkylated compound may be referred to, for example, a method described in Japanese Patent Application Laid-Open Nos. 39956/2001 (JP-2001-39956A), 11057/2001 (JP-2001-11057A) and 279162/1999 (JP-11-279162A), or U.S. Pat. No. 323553 specification, and others.

By the reaction of the derivative of the cyanoalkylated compound and the biguanide compound (in particular, a biguanyl compound) can be obtained a new guanamine compound. The details regarding such production method may be referred to, for example, methods described in U.S. Pat. Nos. 2,423,071, 2,423,353 and 2,425,287 specifications, Great Britain Patent No. 569100 specification, or others.

Among the guanamine compounds obtained by such a method, examples of a guanamine compound having an aliphatic amine residue may include an N-guanamylalkyl-N-mono- or N,N-dialkylamine such as N-[β-(2,4-diamino-s-triazin-6-yl)ethyl]-N-methylamine (e.g., an N-guanamyl$C_{2-4}$alkyl-N-mono- or N,N-di$C_{1-6}$alkylamine); an N-guanamylalkyl-N-mono- or N,N-di(hydroxyalkyl)amine such as N,N-bis[β-(2,4-diamino-s-triazin-6-yl)ethyl]aminoethanol [for example, an N-guanamyl$C_{2-4}$alkyl-N-mono- or N,N-di(hydroxy$C_{1-6}$alkyl)amine]; and a (poly)guanamylalkyl-(poly)alkylenepolyamine such as bis[β-(2,4-diamino-s-triazin-6-yl)ethyl]ethylenediamine, tetrakis[β-(2,4-diamino-s-triazin-6-yl)ethyl]ethylenediamine, tetrakis[β-(2',4'-diamino-s-triazin-6'-yl)ethyl]-1,3-propanediamine, tetrakis[β-(2',4'-diamino-s-triazin-6'-yl)ethyl]-1,2-propanediamine, tetrakis[β-(2',4'-diamino-s-triazin-6'-yl)ethyl]-1,4-butanediamine, or pentakis[β-(2,4-diamino-s-triazin-6-yl)ethyl]diethylenetriamine [e.g., a di- to penta(guanamyl$C_{2-4}$alkyl)-$C_{1-6}$alkylene-di- to tetramine].

Among the guanamine compounds having a cyclic amine residue, the compound having a piperazine residue may include an N-guanamylalkylpiperazine such as 1,4-bis[β-(2',4'-diamino-s-triazin-6'-yl)ethyl]piperazine (e.g., a N-mono- or N,N-bisguanamyl$C_{2-4}$alkylpiperazine), and the compound having a morpholine residue may include 4-[β-(2',4'-diamino-s-triazin-6'-yl)ethyl]morpholine and an N-guanamylalkylmorpholine (e.g., an N-guanamyl$C_{2-4}$alkylmorpholine). Moreover, among cyclic amines, examples of the guanamine compound having imidazole residue may include an N-guanamylalkylimidazole such as 2,4-diamino-6-[β-(imidazol-1'-yl)ethyl]-s-triazine or 2,4-diamino-6-[α-methyl-β-(imidazol-1-yl)]ethyl-s-triazine (e.g., an N-guanamyl$C_{2-4}$alkylimidazole), and a derivative thereof [for example, an N-guanamylalkyl-alkylimidazole such as 2,4-diamino-6-(2'-methyl-imidazol-1'-yl)ethyl-s-triazine, 2,4-diamino-6-(2'-undecylimidazol-1'-yl)ethyl-s-triazine or 2,4-diamino-6-(2'-ethyl-4'-methyl-imidazol-1'-yl)ethyl-s-triazine (e.g., an N-guanamyl$C_{2-4}$alkyl-$C_{1-12}$alkyl-imidazole); and 2-guanamylethylimidazole or 2-guanamyl-2-methylethylimidazole compound which may have an alkyl group or cycloalkyl group in an imidazole moiety thereof, described in Japanese Patent Publication Nos. 36391/1972 (JP-47-36391B) and 41120/1972 (JP-47-41120B)], and others.

Examples of the compound having an alkyleneurea residue among the guanamine compounds having a residue of a cyclic urea compound may include a guanamylalkyl-alkyleneurea such as 1,3-bis[β-(2',4'-diamino-s-triazin-6'-yl)ethyl]ethyleneurea, 1,3-bis[β-(2',4'-diamino-s-triazin-6'-yl)ethyl]propyleneurea or 1,3,5,7-tetrakis[β-(2',4'-diamino-s-triazin-6'-yl)ethyl]acetyleneurea (e.g., a guanamyl$C_{2-4}$alkyl-$C_{1-10}$alkyleneurea, and a guanamyl$C_{2-4}$alkyl-crosslinked alkyleneurea), and the like.

Among guanamine compounds having a residue of a cyclic urea compound, examples of the compound having an isocyanuric acid residue may include a mono- to tris(guanamylalkyl)isocyanurate such as a mono- to tris(2,4-diamino-s-triazin-6-yl)methylisocyanurate, a mono- to tris[β-(2,4-diamino-s-triazin-6-yl)ethyl]isocyanurate, or a mono- to tris[α-methyl-β-(2,4-diamino-s-triazin-6-yl)ethyl]isocyanurate [for example, a mono- to tris(guanamyl$C_{2-4}$alkyl)isocyanurate; a mono- or bis(carboxy$C_{1-6}$alkyl)-bis- or mono[(2,4-diamino-s-triazin-6-yl)$C_{1-6}$alkyl]isocyanurate such as a mono- or bis(β-carboxyethyl)-bis- or mono[β-(2,4-diamino-s-triazin-6-yl)ethyl]isocyanurate, or a mono- or bis(γ-carboxypropyl)-bis- or mono[γ-(2,4-diamino-s-triazin-6-yl) propyl]isocyanurate; and a mono- or bis($C_{1-5}$alkoxy-carbonyl$C_{1-6}$alkyl)-bis- or mono[(2,4-diamino-s-triazin-6-yl)$C_{1-6}$alkyl]isocyanurate such as a mono- or bis(β-alkoxycarbonylethyl)-bis- or mono[β-(2,4-diamino-s-triazin-6-yl)ethyl]isocyanurate, or a mono- or bis(γ-alkoxycarbonylpropyl)-bis- or mono[γ-(2,4-diamino-s-triazin-6-yl)propyl]isocyanurate]; a mono(cyanoalkyl)-mono(guanamylalkyl)isocyanurate such as mono (cyanomethyl)mono[β-(2,4-diamino-s-triazin-6-yl)methyl] isocyanurate or mono(β-cyanoethyl)-mono[β-(2,4-diamino-s-triazin-6-yl)ethyl]isocyanurate [e.g., a mono(cyano $C_{2-4}$alkyl)-mono(guanamyl$C_{2-4}$alkyl)isocyanurate]; a mono- or bis(cyanoalkyl)-bis- or mono(guanamylalkyl)isocyanurate such as a mono- or bis(cyanomethyl)-bis- or mono[β-(2,4-diamino-s-triazin-6-yl)methyl]isocyanurate, or a mono- or bis(β-cyanoethyl)-bis- or mono[β-(2,4-diamino-s-triazin-6-yl)ethyl]isocyanurate [for example, a mono- or bis(cyano$C_{2-4}$alkyl)-bis- or mono(guanamyl $C_{2-4}$alkyl)isocyanurate], a salt of a mono- or bis(carboxy$C_{1-6}$alkyl)-bis- or mono[(2,4-diamino-s-triazin-6-yl)$C_{1-6}$alkyl] isocyanurate with isocyanuric acid such as a salt of a mono- or bis(β-carboxyethyl-bis- or mono[β-(2,4-diamino-s-triazin-6-yl)ethyl]isocyanurate with isocyanuric acid, and another salt of a mono- or bis($C_{1-5}$alkoxy-carbonyl$C_{1-6}$alkyl)-bis- or mono[(2,4-diamino-s-triazin-6-yl)$C_{1-6}$alkyl] isocyanurate with isocyanuric acid such as a salt of a mono- or bis(β-alkoxycarbonylethyl)-bis- or mono[β-2,4-diamino-s-triazin-6-yl]ethyl)isocyanurate with isocyanuric acid], and others.

Examples of the compounds having a hydantoin residue, among the guanamine compounds having a residue of a cyclic urea compound, may include a guanamylalkylhydantoin such as 3-[β-(2',4'-diamino-s-triazin-6'-yl)ethyl]hydantoin or 1,3-bis[β-(2',4'-diamino-s-triazin-6'-yl)ethyl]hydantoin (e.g., a mono- or bisguanamyl$C_{2-4}$alkyl-hydantoin); and a guanamylalkyl-alkylhydantoin such as 3-[β-(2',4'-diamino-s-triazin-6'-yl)ethyl]-3-n-propylhydantoin, 3-[β-(2',4'-diamino-s-triazin-6'-yl)ethyl]-3-isopropylhydantoin, 3-[β-(2',4'-diamino-s-triazin-6'-yl)ethyl]-5,5-dimethylhydantoin or 1,3-bis[β-(2',4'-diamino-s-triazin-6'-yl)ethyl]-5,5-dimethylhydantoin [e.g., a mono- or bis(guanamyl $C_{2-4}$alkyl)-$C_{1-6}$alkyl-hydantoin].

As the guanamine compound having an imide residue, there may be mentioned, for example, N-[β-(2',4'-diamino-s-triazin-6'-yl)ethyl]phthalimide, N,N'-bis[β-(2',4'-diamino-s-triazin-6'-yl)ethyl]pyromellit diimide, N,N',N''-tris[β-(2',4'-diamino-s-triazin-6'-yl)ethyl]trimellitimide, and others.

The guanamine compound may also include a salt of the guanamine compound. The guanamine compound usually forms a salt together with a salifiable compound which is capable of forming a salt with an amino group of a guanamine ring of the guanamine compound, through the amino group. Such a salifiable compound is not particularly limited to a specific one as long as the compound is capable of forming a salt with the amino group, and for example, may include an inorganic protonic acid, and an organic protonic acid. The salifiable compound preferably includes a hydroxyl group-containing compound, in particular, a nitrogen-containing cyclic compound having a hydroxyl group.

The nitrogen-containing cyclic compound having a hydroxyl group includes a compound comprising at least one hydroxyl group and a heterocycle having at least one nitrogen atom as a hetero atom of a ring thereof. Examples of the heterocycle may include a 5- or 6-membered nitrogen-containing ring having a plurality of nitrogen atoms as constituent atoms of a ring thereof, particularly a triazine ring.

The triazine compound may include a 1,3,5-triazine compound, a 1,2,3-triazine compound, and a 1,2,4-triazine compound. In the triazine compound having a hydroxyl group, the arbitrary site(s) of the triazine ring (nitrogen atom and carbon atom, particularly carbon atom) may have a hydroxyl group(s) as substituent(s). The number of the hydroxyl group is not particularly limited to a specific one, and is about 1 to 4, especially about 1 to 3 (for example about 2 to 3). The preferred hydroxyl group-containing triazine compound includes a hydroxyl group-containing 1,3,5-triazine compound, in particular cyanuric acid or a derivative thereof, e.g., cyanuric acid or isocyanuric acid, ammeline, ammelide, and others.

In the salt of the guanamine compound, the proportion of the nitrogen-containing cyclic compound having a hydroxyl group is about 0.1 to 1.2 mol, and preferably about 0.4 to 1 mol, relative to 1 mol of the guanamine site of the guanamine compound. In the case of a guanamine compound having a plurality of guanamine rings, each guanamine ring may form a salt with the same or different nitrogen-containing cyclic compound having a hydroxyl group.

The salt of such a guanamine compound includes, to take a salt or reaction product with isocyanuric acid as an example, a salt of the above-mentioned guanamine compound with isocyanuric acid. Among these salts, examples of the salt of the guanamine compound having an isocyanuric acid residue with isocyanuric acid may include a salt of a mono- to tris[(2,4-diamino-s-triazin-6-yl)$C_{1-6}$alkyl]isocyanurate with isocyanuric acid, such as a salt of tris[β-(2,4-diamino-s-triazin-6-yl)ethyl]isocyanurate with isocyanuric acid; a salt of a mono(cyano$C_{1-6}$alkyl)-mono[(2,4-diamino-s-triazin-6-yl)$C_{1-6}$alkyl]isocyanurate with isocyanuric acid, such as a salt of mono(β-cyanoethyl)-mono[β-(2,4-diamino-s-triazin-6-yl)ethyl]isocyanurate with isocyanuric acid; a salt of a mono- or bis(cyano$C_{1-6}$alkyl)-bis- or mono[(2,4-diamino-s-triazin-6-yl)$C_{1-6}$alkyl]isocyanurate with isocyanuric acid, such as a salt of a mono- or bis(β-cyanoethyl)-bis- or mono[β-(2,4-diamino-s-triazin-6-yl)ethyl]isocyanurate with isocyanuric acid; and the like. Incidentally, these compounds having an isocyanuric acid residue are novel compounds.

In the salt of the guanamine compound, there is no particular limitation as to the proportion of isocyanuric acid. The proportion of isocyanuric acid is, for example, about 0.2 to 6 mol and preferably about 0.3 to 4 mol relative to 1 mol of the guanamine compound, and may be about 0.5 to 3 mol (e.g., about 1 to 3 mol) relative to 1 mol of the guanamine compound. For example, the salt of tris[β-(2,4-diamino-5-triazin-6-yl)ethyl]isocyanurate with isocyanuric acid may include a salt of tris[β-(2,4-diamino-s-triazin-6-yl)ethyl]isocyanurate with isocyanuric acid (the molar ratio [the isocyanurate/the isocyanuric acid]=1/1]), a salt of tris[β-(2,4-diamino-s-triazin-6-yl)ethyl]isocyanurate with isocyanuric acid (the molar ratio [the isocyanurate/the isocyanuric acid]=1/1.5]), a salt of tris[β-(2,4-diamino-s-triazin-6-yl) ethyl]isocyanurate with isocyanuric acid (the molar ratio [the isocyanurate/the isocyanuric acid]=1/3]), and others. Moreover, As the salt of bis[β-(2,4-diamino-s-triazin-6-yl) ethyl]isocyanurate with isocyanuric acid, there may be mentioned a salt of bis[β-(2,4-diamino-s-triazin-6-yl)ethyl]isocyanurate with isocyanuric acid (the molar ratio [the isocyanurate/the isocyanuric acid]=1/1]), a salt of bis[β-(2, 4-diamino-s-triazin-6-yl)ethyl]isocyanurate with isocyanuric acid (the molar ratio [the isocyanurate/the isocyanuric acid]=1/2]), and others.

The salt of the guanamine compound may be produced by, for example, allowing the guanamine compound to react with the salifiable compound (e.g., the nitrogen-containing cyclic compound having a hydroxyl group). The reaction may be carried out in a solvent. As the solvent, water, an organic solvent exemplified in the paragraph of the reaction solvent for the above-mentioned reaction A and reaction B1, a mixed solvent of water and the organic solvent, or others may be used. For example, the salt of the guanamine compound may be produced by dissolving or dispersing the guanamine compound and the salifiable compound (e.g., isocyanuric acid) in the solvent, if necessary under heating, to allow the guanamine compound to react with the salifiable compound.

In the resin composition of the present invention, the guanamine compound or a salt thereof performs as a stabilizer. In the resin composition, the proportion of the guanamine compound or a salt thereof is about 0.001 to 10 parts by weight, preferably about 0.01 to 5 parts by weight, and more preferably 0.01 to 1 part by weight, relative to 100 parts by weight of the resin.

[Polyacetal Resin]

The polyacetal resin is a macromolecular compound containing oxymethylene group (—CH$_2$O—) as a predominant constituent unit and includes polyacetal homopolymers (e.g., trade name "Delrin", manufactured by DuPont, U.S.A.; trade name "Tenac 4010", manufactured by Asahi Kasei Corp.; etc.) and polyacetal copolymers comprising other comonomer unit in addition to the oxymethylene unit (e.g., trade name "Duracon", manufactured by Polyplastics Co., Ltd.). Referring to such copolymers, the comonomer unit includes oxyalkylene units of about 2 to 6 carbon atoms (preferably about 2 to 4 carbon atoms), for example, oxyethylene (—CH$_2$CH$_2$O—), oxypropylene, and oxytetramethylene units. The proportion of such comonomer unit may be small and, for example, can be selected from the range of about 0.01 to 30 mole %, preferably about 0.03 to 20 mole % (e.g., 0.05 to 18 mole %), and more preferably about 0.1 to 15 mole %, relative to the whole polyacetal resin.

The polyacetal copolymer may be, for example, a copolymer containing two components, a terpolymer containing three components and so on. The polyacetal copolymer may also be a random copolymer, a block copolymer (e.g., Japanese Patent Publication No. 24307/1990 (JP-2-24307B), manufactured by Asahi Kasei Corp., trade name "Tenac LA", "Tenac LM"), or a graft copolymer. Moreover, the polyacetal resin may be linear (or straight) or branched, and may have a crosslinked structure. In addition, the end groups of the polyacetal resin may have been stabilized by esterification with a carboxylic acid such as acetic acid or propionic acid, or an anhydride thereof. There is no particular limitation on the degree of polymerization, the degree of branching, or the degree of crosslinking of the polyacetal, only provided it can be melt-molded. There is no particular restriction as to the molecular weight of the polyacetal resin, and, for example, the weight average molecular weight is about 5,000 to 500,000, and preferably about 10,000 to 400,000.

The polyacetal resin can be, for example, produced by polymerizing an aldehyde such as formaldehyde, paraformaldehyde, or acetaldehyde; or a cyclic ether or cyclic formal such as trioxane, ethylene oxide, propylene oxide, butylene oxide, styrene oxide, cyclohexene oxide, 1,3-dioxolane, diethylene glycol formal, or 1,4-butanediol formal. Further, as a copolymerizable component, an alkyl or arylglycidyl ether (e.g., methylglycidyl ether, ethylglycidyl ether, phenylglycidyl ether, and naphthylglycidyl ether), an alkylene or polyoxyalkylene glycol diglycidyl ether (e.g., ethylene glycol diglycidyl ether, triethylene glycol diglycidyl ether, and butanediol diglycidyl ether), an alkyl or arylglycidylalcohol, acyclic ester (e.g., β-propiolactone), or a vinyl compound (e.g., styrene, and vinyl ether) can be employed.

[Antioxidant]

Moreover, the resin composition of the present invention comprises an antioxidant (or a stabilizer) to maintain heat resistance of the composition for a long term. The antioxidant or stabilizer may include, for example, a phenol-series (e.g., a hindered phenol), an amine-series (e.g., a hindered amine), a phosphorus-containing (or phosphorus-series), a sulfur-containing (or sulfur-series), a hydroquinone-series, and a quinoline-series antioxidants (or stabilizers). These antioxidants may be used singly or in combination.

The hindered phenol-series compound may include a conventional phenol-series antioxidant, for example, a monocyclic hindered phenolic compound (e.g., 2,6-di-t-butyl-p-cresol), a polycyclic hindered phenolic compound in which rings are connected or bonded to each other through a hydrocarbon group or a group containing a sulfur atom [e.g., a $C_{1-10}$alkylene-bis to tetrakis(t-butylphenol) such as 2,2'-methylenebis(4-methyl-6-t-butylphenol), 4,4'-methylenebis(2,6-di-t-butylphenol) or 1,1,3-tris(2-methyl-4-hydroxy-5-t-butylphenyl)butane; a $C_{2-10}$alkenylene or dienylene-bis to tetrakis(t-butylphenol) such as 4,4'-butylidenebis(3-methyl-6-t-butylphenol); a $C_{6-20}$arylene or aralkylene-bis to tetrakis(t-butylphenol) such as 1,3,5-trimethyl-2,4,6-tris(3,5-di-t-butyl-4-hydroxybenzyl) benzene; and a bis(t-butylphenol) in which t-butylphenol groups are connected or bonded to each other through a group having a sulfur atom, for example, 4,4'-thiobis(3-methyl-6-t-butylphenol)], a hindered phenolic compound having an ester group or an amide group [e.g., a t-butylphenol having a $C_{2-10}$alkylene carbonyloxy group, exemplified by n-octadecyl-3-(4'-hydroxy-3',5'-di-t-butylphenyl)propionate or n-octadecyl-2-(4'-hydroxy-3',5'-di-t-butylphenyl)propionate; a bis to tetrakis(t-butylphenol) in which t-butylphenol groups are connected or bonded to each other through a polyol ester of a fatty acid, exemplified by 1,6-hexanediol-bis[3-(3,5-di-t-butyl-4-hydroxyphenyl)propionate], triethylene glycol-bis [3-(3-t-butyl-5-methyl-4-hydroxyphenyl)propionate] or pentaerythritol tetrakis[3-(3,5-di-t-butyl-4-hydroxyphenyl) propionate]; a bis to tetrakis (t-butylphenol) having a heterocyclic group and a $C_{2-10}$alkylenecarbonyloxy group, exemplified by 3,9-bis[2-{3-(3-t-butyl-4-hydroxy-5-methylphenyl)propionyloxy}-1,1-dimethylethyl]-2,4,8,10-tetraoxaspiro[5.5]undecane; a t-alkylphenol (e.g., t-butylphenol, and t-pentylphenol) having a $C_{3-10}$alkenylcarbonyloxy group, exemplified by 2-t-butyl-6-(3'-t-butyl-5'-methyl-2'-hydroxybenzyl)-4-meth ylphenylacrylate or 2-[1-(2-hydroxy-3,5-di-t-pentylphenyl)ethyl]-4,6-di-t-pent ylphenylacrylate; a hindered phenolic compound having a phosphonic ester group, exemplified by di-n-octadecyl-3,5-di-t-butyl-4-hydroxybenzylphosphonate; a hindered phenolic compound having an amide group, exemplified by N,N'-hexamethylenebis(3,5-di-t-butyl-4-hydroxy-dihydrocinnamamide)], and others. Among them, a phenolic compound having a t-butyl group (particularly, a plurality of t-butyl groups), in particular, a compound having a plurality of t-butylphenol sites, is preferred. In particular, a bis to tetrakis(mono to tetra t-butylphenol) in which t-butylphenol groups are connected or bonded to each other through the polyol ester of the fatty acid, in particular, a bis to tetrakis (mono or di t-butylphenol) in which t-butylphenol groups are connected or bonded to each other through a di- to tetra-ol ester group of a $C_{2-10}$fatty acid (particularly, a $C_{2-6}$fatty acid) is preferred.

The amine-series antioxidant may include a hindered amine, for example, a tri- or tetra$C_{1-3}$alkylpiperidine or a derivative thereof [e.g., 2,2,6,6-tetramethylpiperidine which may have a substituent (such as methoxy, benzoyloxy or phenoxy group) at 4-position], a bis (tri-, tetra- or penta$C_{1-3}$alkylpiperidine) $C_{2-20}$alkylenedicarboxylic ester [e.g., bis (2,2,6,6-tetramethyl-4-piperidyl) oxalate, a melonate, adipate, sebacate and terephthalate corresponding to the oxalate; bis(1,2,2,6,6-pentamethyl-4-piperidyl) sebacate, and bis[1-octyloxy-2,2,6,6-tetramethyl-4-piperidyl] sebacate], 1,2-bis(2,2,6,6-tetramethyl-4-piperidyloxy)ethane, an aromatic amine [e.g., phenylnaphthylamine, N,N'-diphenyl-1,4-phenylenediamine, N-phenyl-N'-cyclohexyl-1,4-phenylenediamine, and 4,4'-di(α,α-dimethylbenzyl)diphenylamine], and others.

The phosphorus-containing stabilizer (or antioxidant) includes, for example, a phosphite-series stabilizer such as triisodecyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, a tris(branched $C_{3-6}$alkylphenyl) phosphite [e.g., tris(2,4-di-t-butylphenyl) phosphite, tris(2-t-butyl-4-methylphenyl) phosphite, and tris(2,4-di-t-amylphenyl) phosphite], bis- or tris(2-t-butylphenyl)phenyl phosphite, tris(2-cyclohexylphenyl) phosphite, or a bis($C_{3-6}$alkylaryl)pentaerythritol diphosphite, [e.g., bis(2,4-di-t-butylphenyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, and bis(nonylphenyl)pentaerythritol diphosphite], a triphenyl phosphate-series stabilizer (e.g., 4-phenoxy-9-α-(4-hydroxyphenyl)-p-cumenyloxy-3,5,8,10-tetraoxa-4,9-diphosphapyro[5.5]undecane, and tris(2,4-di-t-butylphenyl) phosphate], a diphosphonite-series stabilizer (e.g., tetrakis(2,4-di-t-butyl)-4,4'-biphenylene diphosphonite, and tetrakis(2,4-di-t-butyl-5-methyl)-4,4'-biphenylene diphosphonite), and a metal salt of hypophosphorous acid (e.g., a salt of sodium, potassium, calcium, magnesium, barium, zinc, or aluminum). Moreover, the phosphorus-containing stabilizer also includes a phosphine-series stabilizer.

The phosphine-series stabilizer may include a phosphine compound such as an alkyl phosphine (e.g., a tri$C_{1-10}$alkyl phosphine such as triethyl phosphine, tripropyl phosphine, or tributyl phosphine), a cycloalkyl phosphine (e.g., a tri $C_{5-12}$cycloalkyl phosphine such as tricyclohexyl phosphine), an aryl phosphine (e.g., a tri$C_{6-12}$aryl phosphine such as triphenyl phosphine, p-tolyldiphenyl phosphine, di-p-tolylphenyl phosphine, tri-m-aminophenyl phosphine, tri-2, 4-dimethylphenyl phosphine, tri-2,4,6-trimethylphenyl phosphine, tri-o-tolyl phosphine, tri-m-tolyl phosphine, or tri-p-tolyl phosphine), an aralkyl phosphine (e.g., a tri $C_{6-12}$aryl$C_{1-4}$alkyl phosphine such as tri-o-anisyl phosphine, or tri-p-anisyl phosphine), an arylalkenyl phosphine (e.g., a di$C_{6-12}$aryl$C_{2-10}$alkenyl phosphine such as diphenylvinyl phosphine, or allyldiphenyl phosphine), an arylaralkyl phosphine (e.g., a di$C_{6-12}$aryl-$C_{6-12}$aryl$C_{1-4}$alkyl phosphine such as p-anisyldiphenyl phosphine; and a $C_{6-12}$aryldi ($C_{6-12}$aryl$C_{1-4}$alkyl) phosphine such as di-p-anisylphenyl phosphine), an alkylarylaralkyl phosphine (e.g., a $C_{1-10}$alkyl$C_{6-12}$aryl$C_{6-12}$aryl$C_{1-4}$alkyl phosphine such as methylphenyl-p-anisyl phosphine), or a bisphosphine compound [e.g., a bis(di$C_{6-12}$arylphosphino)$C_{1-10}$alkane such as 1,4-bis(diphenylphosphino)butane], and others.

The hydroquinone-series antioxidant may include, for example, 2,5-di-t-butylhydroquinone, and the quinoline-series antioxidant may include, for example, 6-ethoxy-2,2,4-trimethyl-1,2-dihydroquinoline. Examples of the sulfur-containing antioxidant may include dilauryl thiodipropionate, and distearyl thiodipropionate.

Among these antioxidants, at lest one member selected from the group consisting of the hindered phenol-series and the hindered amine-series antioxidants is preferred.

In the resin composition of the present invention, the proportion of the antioxidant is about 0.001 to 5 parts by weight, preferably about 0.005 to 3 parts by weight, and more preferably about 0.01 to 1 part by weight, relative to 100 parts by weight of the polyacetal resin.

The resin composition of the present invention may contain, if necessary, at least one member selected from the group consisting of a processing stabilizer and a heat stabilizer. The processing stabilizer and the heat stabilizer may be used singly or in combination. In particular, the resin composition preferably contains both the processing stabilizer and the heat stabilizer.

[Processing Stabilizer]

The processing stabilizer may include at least one member selected from (a) a long-chain or higher fatty acid or a derivative thereof, (b) water and/or an alcohol, (c) an organosiloxane, (d) a fluorine-containing compound, (e) a wax, and others.

(a) Long-Chain or Higher Fatty Acid or Derivative Thereof.

The long-chain or higher fatty acid may be a saturated fatty acid or an unsaturated fatty acid. Moreover, a part of hydrogen atoms in the higher fatty acid may be substituted with a substituent(s) such as hydroxyl group. Such a higher fatty acid may be exemplified by a mono- or di-carboxylic fatty acid having not less than 10 carbon atoms, for example, a saturated mono-carboxylic fatty acid having not less than 10 carbon atoms [e.g., a saturated $C_{10-34}$ fatty acid (preferably a saturated $C_{10-30}$ fatty acid) such as capric acid, lauric acid, myristic acid, pentadecylic acid, palmitic acid, stearic acid, arachic acid, behenic acid or montanic acid], an unsaturated mono-carboxylic fatty acid having not less than 10 carbon atoms [e.g., an unsaturated $C_{10-34}$ fatty acid (preferably an unsaturated $C_{10-30}$ fatty acid) such as oleic acid, linoleic acid, linolenic acid, arachidonic acid or erucic acid], a di-carboxylic fatty acid having not less than 10 carbon atoms (a dibasic fatty acid) [e.g., a saturated di-carboxylic $C_{10-30}$ fatty acid (preferably a saturated di-carboxylic $C_{10-20}$ fatty acid) such as sebacic acid, dodecanoic acid, tetradecanoic acid or thapsiaic acid (or thapsic acid), and an unsaturated di-carboxylic $C_{10-30}$ fatty acid (preferably an unsaturated di-carboxylic $C_{10-20}$ fatty acid) such as decenoic diacid or dodecenoic diacid], and others. These fatty acids may be used singly or in combination. The fatty acid also includes one which has one or a plurality of hydroxyl group(s) in the molecular (e.g., a hydroxy-saturated $C_{10-26}$ fatty acid such as 12-hydroxy stearic acid).

The derivative of the higher fatty acid includes, for example, a fatty acid ester, a fatty acid amide, and others. As to the higher fatty acid ester, there is no particular limitation on its structure, and an ester of either a straight or branched chain fatty acid can be used. As the higher fatty acid ester, there may be mentioned, for example, an ester of the above-mentioned higher fatty acid with an alcohol (e.g., an ester having one or a plurality of ester bond(s), such as a monoester, a diester, a triester, or tetraester). There is no particular limitation on a species of the alcohol constituting the higher fatty acid ester. As the alcohol, a polyhydric alcohol is preferred. The polyhydric alcohol may include a polyhydric alcohol having about 2 to 8 carbon atoms (preferably, about 2 to 6 carbon atoms) or a polymer thereof, for example, a diol exemplified by an alkylene glycol [e.g., a $C_{2-8}$alkylene glycol (preferably a $C_{2-6}$alkylene glycol) such as ethylene glycol, diethylene glycol or propylene glycol]; a triol exemplified by glycerin, trimethylolpropane, or a derivative thereof; a tetraol exemplified by pentaerythritol, sorbitan, or a derivative thereof; as well as a homo- or copolymer of the polyhydric alcohol(s) [e.g., a homo- or copolymer of a polyoxyalkylene glycol such as a polyethylene glycol or a polypropylene glycol, a polyglycerin, dipentaerythritol, and a polypentaerythritol]. The average degree of polymerization of the polyalkylene glycol is not less than 2 (e.g., about 2 to 500), preferably about 2 to 400 (e.g., about 2 to 300), and the preferred average degree of polymerization is not less than 16 (e.g., about 20 to 200). Such a polyalkylene glycol is preferably used on esterification with a fatty acid having not less than 12 carbon atoms. The preferred polyhydric alcohol is a polyalkylene glycol having the average degree of polymerization of not less than 2. These polyhydric alcohols may be used singly or in combination.

Examples of such an ester of a long-chain or higher fatty acid may include ethylene glycol mono- or dipalmitate, ethylene glycol mono- or distearate, ethylene glycol mono- or dibehenate, ethylene glycol mono- or dimontanate, glycerin mono- to tripalmitate, glycerin mono- to tristearate, glycerin mono- to tribehenate, glycerin mono- to trimontanate, pentaerythritol mono- to tetrapalmitate, pentaerythritol mono- to tetrastearate, pentaerythritol mono- to tetrabehenate, pentaerythritol mono- to tetramontanate, a polyglycerin tristearate, trimethylolpropane monopalmitate, pentaerythritol monoundecylate, sorbitan monostearate, a monolaurate of a polyalkylene glycol (such as a polyethylene glycol or a polypropylene glycol), a monopalmitate of the polyalkyleneglycol, a monostearate of the polyalkylene glycol, a monobehenate of the polyalkylene glycol, a monomontanate of the polyalkylene glycol, a dilaurate of the polyalkylene glycol, a dipalmitate of the polyalkylene glycol, a distearate of the polyalkylene glycol, a dibehenate of the polyalkylene glycol, a dimontanate of the polyalkylene glycol, a dioleate of the polyalkylene glycol, and a dilinolate of the polyalkylene glycol, and a metal salt of a tribasic inorganic acid with the glycerin mono- to di-long chain fatty acid ester (e.g., a calcium salt of boric acid monoester of glycerin monostearate, and a magnesium salt of boric acid monoester of glycerin monostearate).

As the fatty acid amide, for example, an acid amide (e.g., monoamide and bisamide) of the higher fatty acid (a mono- or di-carboxylic higher fatty acid) with an amine (such as a monoamine, a diamine or a polyamine) may be used. As the monoamide, there may be mentioned, for example, a primary acid amide of a saturated fatty acid (such as capric acid amide, lauric acid amide, myristic acid amide, palmitic acid amide, stearic acid amide, arachic acid amide, behenic acid amide or montanic acid amide); a primary acid amide of an unsaturated fatty acid (such as oleic acid amide); and a secondary acid amide of a saturated and/or an unsaturated fatty acid with a monoamine (such as stearyl stearic acid amide or stearyl oleic acid amide). The preferred fatty acid amide is a bisamide. The bisamide includes, for example, a bisamide of the fatty acid with a $C_{1-6}$alkylenediamine (particularly, a $C_{1-2}$alkylenediamine). The concrete examples of the bisamide include ethylenediamine-dipalmitic acid amide, ethylenediamine-distearic acid amide (ethylene bis-stearyl amide), hexamethylenediamine-distearic acid amide, ethylenediamine-dibehenic acid amide, ethylenediamine-dimontanic acid amide, ethylenediamine-dioleic acid amide, and ethylenediamine-dierucic acid amide. Furthermore, a bisamide in which different species of acyl groups are independently bonded to amine sites of an alkylenediamine, such as ethylenediamine-(stearic acid amide)oleic acid amide, may also be used. In the acid amide, it is preferred that the fatty acid constituting the acid amide is a saturated fatty acid.

These long-chain (or higher) fatty acid amides or derivatives thereof may be used singly or in combination.

(b) Water and/or Alcohol

The alcohol may include a saturated or unsaturated aliphatic alcohol [for example, a $C_{1-34}$alkyl alcohol such as methanol, ethanol, propanol, 2-propanol, butyl alcohol, isobutyl alcohol, s-butyl alcohol, t-butyl alcohol, octyl alcohol, decyl alcohol, or stearyl alcohol; a $C_{2-34}$alkenyl alcohol such as allyl alcohol; and a $C_{2-34}$alkynyl alcohol such as propargyl alcohol], an alicyclic alcohol (for example, a $C_{5-10}$cycloalkanol such as cyclopentanol, or cyclohexanol), an aromatic alcohol (e.g., a $C_{6-14}$aryl-$C_{1-6}$alkyl alcohol such as benzyl alcohol), a polyhydric alcohol or a derivative thereof (e.g., a polymer of a polyhydric alcohol, and a substituted polyhydric alcohol), a saccharide (e.g., a monosaccharide such as glucose, galactose, or fructose; an oligosaccharide such as trehalose, sucrose, maltose, or raffinose; a sugar alcohol such as erythritol, xylitol, or sorbitol; and a polysaccharide such as a cellulose, or a starch), and others.

The polyhydric alcohol or a derivative thereof may include a $C_{2-8}$polyhydric alcohol (preferably a $C_{2-6}$polyhydric alcohol) or a polymer thereof (including an oligomer thereof), for example, a diol compound such as an alkylene glycol (e.g., a $C_{2-8}$alkylene glycol such as ethylene glycol, diethylene glycol, or propylene glycol (preferably a $C_{2-6}$alkyleneglycol)), a triol compound such as glycerin, trimethylolpropane, or a derivative thereof, and a tetraol compound such as pentaerythritol, sorbitan, or a derivative thereof; partially esterified products of these polyhydric alcohols (e.g., an alkyl ester thereof); and oligomers of these polyhydric alcohols (e.g., dipentaerythritol), and homo- or copolymers thereof (e.g., a homo- or copolymer of a polyoxyalkylene glycol, and a polyglycerin).

Moreover, other polyhydric alcohol may also include a cycloamylose compound (e.g., α-, β-, γ-, δ- or ε-cyclodextrin), a chitosan compound, a chitin compound, a polyvinyl alcohol, a partially saponified polyvinyl acetate, an olefin-vinyl alcohol copolymer, and others.

The polyoxyalkylene glycol may include a homopolymer of an alkylene glycol (e.g., a $C_{2-6}$alkylene glycol such as ethylene glycol, propylene glycol, or tetramethylene glycol (preferably a $C_{2-4}$alkylene glycol)), a copolymer thereof, and a derivative thereof. Specific examples of the polyoxyalkylene glycol include a poly$C_{2-6}$oxyalkylene glycol such as a polyethylene glycol, a polypropylene glycol or a polytetramethylene glycol (preferably a poly$C_{2-4}$oxyalkylene glycol), a copolymer such as a polyoxyethylene-polyoxypropylene copolymer (e.g., a random or block copolymer), a polyoxyethylene-polyoxypropylene glyceryl ether, or a polyoxyethylene-polyoxypropylene monobutyl ether, and others. Examples of the preferred polyoxyalkylene glycol include a polymer having an oxyethylene unit, for example, a polyethylene glycol, a polyoxyethylene-polyoxypropylene copolymer, and a derivative thereof. Moreover, the number average molecular weight of the polyoxyalkylene glycol is about $3\times10^2$ to $1\times10^6$ (e.g., about $5\times10^2$ to $5\times10^5$), and preferably about $1\times10^3$ to $1\times10^5$ (e.g., about $1\times10^3$ to $5\times10^4$).

The water and alcohol may be used singly or in combination.

(c) Organosiloxane

The organosiloxane may include a polyorganosiloxane, for example, a homopolymer of a dialkylsiloxane (e.g., dimethylsiloxane), an alkylarylsiloxane (e.g., methylphenylsiloxane) or a diarylsiloxane (e.g., diphenylsiloxane) (for example, a polydimethylsiloxane, and a polymethylphenylsiloxane), or a copolymer thereof. The polyorganosiloxane may be an oligomer, or a crosslinked polymer. Moreover, as the (poly)organosiloxane, there may be also used a branched organosiloxane (for example, a polyorganosilsesquioxane such as a polymethylsilsesquioxane, a polymethylphenylsilsesquioxane, or a polyphenylsilsesquioxane) [for example, trade name "XC99-B5664" manufactured by Toshiba Silicone Co., Ltd., trade name "X-40-9243", "X-40-9244" and "X-40-9805" manufactured by Shin-Etsu Chemical Co., Ltd., and compounds described in Japanese Patent Publication Nos. 40219/2001 (JP-2001-40219B) and 159995/2000 (JP-2000-159995B), and Japanese Patent Application Laid-Open Nos. 158363/1999 (JP-11-158363A), 182832/1998 (JP-10-182832A) and 139964/1998 (JP-10-139964A)], and a modified (poly)organosiloxane having substituent(s) (such as an epoxy group, a hydroxyl group, an alkoxy group, a carboxyl group, an amino group, an ether group, a vinyl group, or a (meth)acryloyl group) in the end or main chain of the molecule (for example, trade name "Si powder DC4-7051, DC4-7081, DC4-7105, and DC1-9641" and the like (manufactured by Dow Corning Toray Silicone Co., Ltd.)). These silicone-series compound (organosiloxane) may be used singly or in combination.

(d) Fluorine-Containing Compound

The fluorine-containing compound may include a fluorine-containing oligomer, a fluorine-containing resin (or fluororesin), and others. The fluorine-containing oligomer and fluorine-containing resin may include a homo- or copolymer of a fluorine-containing monomer such as tetrafluoroethylene, chlorotrifluoroethylene, vinylidene fluoride, hexafluoropropylene or perfluoroalkyl vinyl ether; a copolymer of the fluorine-containing monomer and a copolymerizable monomer (e.g., an olefinic monomer such as ethylene or propylene; and a (meth)acrylic monomer such as an alkyl (meth)acrylate); a polymer obtained by photooxidation of the fluorine-containing monomer with oxygen; and others. As such a fluorine-containing oligomer and fluorine-containing resin, for example, there may be mentioned a homopolymer such as a polytetrafluoroethylene, a polychlorotrifluoroethylene, or a polyvinylidene fluoride; and a copolymer such as a tetrafluoroethylene-hexafluoropropylene copolymer, a tetrafluoroethylene-perfluoroalkyl vinyl ether copolymer, an ethylene-tetrafluoroethylene copolymer, or an ethylene-chlorotrifluoroethylene copolymer. These fluorine-containing compounds may be used singly or in combination.

(e) Wax

The wax may include a polyolefinic wax, and the like. As the polyolefinic wax, there may be mentioned a polyC$_{2-40}$olefinic wax such as a polyethylene wax or a polypropylene wax, an olefinic copolymer wax such as an ethylene copolymer wax, and a partially oxidized substance or mixture thereof. The olefinic copolymer includes, for example, a copolymer of an olefin (e.g., an α-olefin such as ethylene, propylene, 1-butene, 2-butene, isobutene, 3-methyl-1-butene, 4-methyl-1-butene, 2-methyl-2-butene, 4-methyl-1-pentene, 1-hexene, 2,3-dimethyl-2-butene, 1-heptene, 1-octene, 1-nonene, 1-decene, or 1-dodecene), a copolymer of the olefin and a copolymerizable monomer, for example, a polymerizable monomer such as an unsaturated carboxylic acid or an anhydride thereof [e.g., maleic anhydride, (meth) acrylic acid], or a (meth)acrylate [e.g., a C$_{1-10}$alkyl (meth) acrylate such as methyl (meth)acrylate, ethyl (meth)acrylate, propyl (meth)acrylate, butyl (meth)acrylate, or 2-ethylhexyl (meth)acrylate (preferably a C$_{1-4}$alkyl (meth)acrylate)]. Moreover, the copolymer includes a random copolymer, a block copolymer, or a graft copolymer. The olefinic copolymer wax is usually a copolymer of ethylene and at least one monomer selected from other olefin and a polymerizable monomer.

These waxes may be used singly or in combination. Among these waxes, a polyethylene wax is preferred. The number average molecular weight of the wax is about 100 to 20000, preferably about 500 to 15000, and more preferably about 1000 to 12000.

The above-mentioned processing stabilizers may be used singly or in combination.

The proportion of the processing stabilizer is about 0 to 5 parts by weight (e.g., about 0.01 to 5 parts by weight), preferably about 0.03 to 5 parts by weight (e.g., about 0.05 to 3 parts by weight), and particularly about 0.05 to 2 parts by weight relative to 100 parts by weight of the polyacetal resin.

[Heat Stabilizer]

The heat stabilizer includes (a) a basic nitrogen-containing compound, (b) a metal salt of an organic carboxylic acid, (c) an alkali or alkaline earth metal compound, (d) a hydrotalcite, (e) a zeolite, (f) a specific acidic compound, and others.

(a) Basic Nitrogen-Containing Compound

The basic nitrogen-containing compound includes a low molecular compound or a high molecular compound (nitrogen-containing resin). The nitrogen-containing compound having a low molecular weight may include, for example, an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof [e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)], a polyaminotriazine [e.g., guanamine or a derivative thereof, such as guanamine, acetoguanamine, benzoguanamine, succinoguanamine, adipoguanamine, 1,3,6-tris(3,5-diamino-2,4,6-triazinyl)hexane, phthaloguanamine or CTU-guanamine, melamine or a derivative thereof (e.g., melamine, and a condensate of melamine, such as melam, melem or melon)], a salt of a polyaminotriazine compound containing melamine and a melamine derivative with an organic acid [for example, a salt with (iso)cyanuric acid (e.g., melamine cyanurate)], a salt of a polyaminotriazine compound containing melamine and a melamine derivative with an inorganic acid [e.g., a salt with boric acid such as melamine borate, and a salt with phosphoric acid such as melamine phosphate], uracil or a derivative thereof (e.g., uracil, and uridine), cytosine and a derivative thereof (e.g., cytosine, and cytidine), guanidine or a derivative thereof (e.g., a non-cyclic guanidine such as guanidine or cyanoguanidine; and a cyclic guanidine such as creatinine), urea or a derivative thereof [e.g., biuret, biurea, ethylene urea, propylene urea, acetylene urea, a derivative of acetylene urea (e.g., an alkyl-substituted compound, an aryl-substituted compound, an aralkyl-substituted compound, an acyl-substituted compound, a hydroxymethyl-substituted compound, and an alkoxymethyl-substituted compound), isobutylidene diurea, crotylidene diurea, a condensate of urea with formaldehyde, hydantoin, a substituted hydantoin derivative (for example, a mono or $diC_{1-4}$alkyl-substituted compound such as 1-methylhydantoin, 5-propylhydantoin or 5,5-dimethylhydantoin; an aryl-substituted compound such as 5-phenylhydantoin or 5,5-diphenylhydantoin; and an alkylaryl-substituted compound such as 5-methyl-5-phenyl-hydantoin), allantoin, a substituted allantoin derivative (e.g., a mono, di or $triC_{1-4}$alkyl-substituted compound, and an aryl-substituted compound), a metal salt of allantoin (e.g., a salt of allantoin with a metal element of the Group 3B of the Periodic Table of Elements, such as allantoin dihydroxyaluminum, allantoin monohydroxyaluminum or allantoin aluminum), a reaction product of allantoin with an aldehyde compound (e.g., an adduct of allantoin and formaldehyde), a compound of allantoin with an imidazole compound (e.g., allantoin sodium dl-pyrrolidonecarboxylate), an organic acid salt].

The nitrogen-containing resin may include, for example, a homo- or copolymer of a polyvinylamine, a homo- or copolymer of a polyallylamine, an amino resin obtainable from a reaction by using formaldehyde (e.g., a condensation resin such as a guanamine resin, a melamine resin or a guanidine resin; a co-condensation resin such as a phenol-melamine resin, a benzoguanamine-melamine resin or an aromatic polyamine-melamine resin), an aromatic amine-formaldehyde resin (e.g., aniline resin), a polyamide resin (e.g., a homo- or copolymerized polyamide such as nylon 3 (poly-β-alanine), nylon 46, nylon 6, nylon 66, nylon 11, nylon 12, nylon MXD6, nylon 6-10, nylon 6-11, nylon 6-12, or nylon 6-66-610, a substituted polyamide containing a methylol or alkoxymethyl group), a polyesteramide, a polyamideimide, a polyurethane, a poly(meth)acrylamide, a copolymer of (meth)acrylamide and other vinyl monomer, a poly(vinyllactam), a copolymer of vinyllactam and other vinyl monomer (for example, homo- or copolymers described in Japanese Patent Application Laid-Open No. 52338/1980 (JP-55-52338A), and U.S. Pat. No. 3,204,014)), a poly(N-vinylformamide) or a derivative thereof (e.g., an N-vinylformamide-N-vinylamine copolymer) (for example, trade name "PNVE Series" manufactured by Mitsubishi Chemical Corporation), a copolymer of N-vinylformamide and other vinyl monomer, a poly(N-vinylcarboxylic acid amide), a copolymer of N-vinylcarboxylic acid amide and other vinyl monomer (for example, homo- or copolymers described in Japanese Patent Application Laid-Open Nos. 247745/2001 (JP-2001-247745A), 131386/2001 (JP-2001-131386A), 311302/1996 (JP-8-311302A) and 86614/1984 (JP-59-86614A), U.S. Pat. Nos. 5,455,042, 5,407,996 and 5,338,815), and trade names "Noniolex" and "Cleatech" manufactured by Showa Denko K.K.), and others.

These basic nitrogen-containing compounds may be used singly or in combination.

The preferred nitrogen-containing compound includes a guanamine compound (e.g., adipoguanamine, and CTU-guanamine), melamine or a derivative thereof [particularly, melamine or a melamine condensate (e.g., melam, and melem)], a guanidine derivative (e.g., cyanoguanidine, and creatinine), a urea derivative [e.g., biurea, a condensate of urea with formaldehyde, allantoin, and a metal salt of allantoin (such as allantoin dihydroxyaluminum)], a hydrazine derivative (e.g., a carboxylic acid hydrazide), a nitrogen-containing resin [e.g., an amino resin (an amino resin such as a melamine resin or a melamine-formaldehyde resin; a crosslinked amino resin such as a crosslinked melamine resin), a polyamide resin, a poly(meth)acrylamide, a poly(N-vinylformamide), a poly(N-vinylcarboxylic acid amide), and a poly(vinyllactam)]. Among them, in particular, combination use of at least one member selected from the group consisting of biurea, allantoin, a metal salt of allantoin, a carboxylic acid hydrazide and a polyamide resin, and a guanamine compound having a unit represented by the above-mentioned formula (I) can bring in significant reduction of an amount of formaldehyde generated from the shaped article. The nitrogen-containing compound may be used as a resin master batch containing the compound [in particular, the carboxylic acid hydrazide (e.g., at least one member selected from the group consisting of the aliphatic carboxylic acid hydrazide and the aromatic carboxylic acid hydrazide)]. The nitrogen-containing compound [for example, the urea compound (e.g., biurea), and the carboxylic acid hydrazide (e.g., at least one member selected from the group consisting of the aliphatic carboxylic acid hydrazide and the aromatic carboxylic acid hydrazide)] may used in the form of a master batch by melt-mixing the compound with a thermoplastic resin (e.g., a polyacetal resin, a styrenic resin, an acrylic resin, an olefinic resin, a polyamide-series resin, a polyurethane-series resin, and a polyester-series resin). The nitrogen-containing compound may be used as a resin master batch containing the compound. In the resin master batch, the proportion of the nitrogen-containing compound may be, for example, about 1 to 80% by weight.

(b) Metal Salt of Organic Carboxylic Acid

The metal salt of the organic carboxylic acid includes, for example, a salt of an organic carboxylic acid with a metal (e.g., an alkali metal such as Na or K; an alkaline earth metal such as Mg or Ca; and a transition metal such as Zn).

The organic carboxylic acid may be a compound of low molecular weight or a compound of high molecular weight. As the organic carboxylic acid, there may be used a saturated or unsaturated lower aliphatic carboxylic acid having less than 10 carbon atoms, and a polymer of an unsaturated aliphatic carboxylic acid, in addition to a saturated or unsaturated higher aliphatic carboxylic acid exemplified in item of the higher fatty acid. Moreover, these aliphatic carboxylic acids may have a hydroxyl group. The saturated lower aliphatic carboxylic acid may include a saturated $C_{1-9}$monocarboxylic acid (e.g., acetic acid, propionic acid, butyric acid, isobutyric acid, valeric acid, isovaleric acid, pivalic acid, caproic acid, and caprylic acid), a saturated $C_{2-9}$dicarboxylic acid (e.g., oxalic acid, malonic acid, succinic acid, glutaric acid, adipic acid, pimelic acid, cork acid, and azelaic acid), and a hydroxy acid thereof (e.g., glycolic acid, lactic acid, glyceric acid, hydroxybutyric acid, and citric acid).

The unsaturated lower aliphatic carboxylic acid includes, for example, an unsaturated $C_{3-9}$monocarboxylic acid [e.g., (meth)acrylic acid, crotonic acid, and isocrotonic acid], an unsaturated $C_{4-9}$dicarboxylic acid (e.g., maleic acid, and fumaric acid), and a hydroxy acid thereof (e.g., propiolic acid).

Moreover, exemplified as the polymer of the unsaturated aliphatic carboxylic acid may be a copolymer of a polymerizable unsaturated carboxylic acid [for example, an α, β-ethylene-type (ethylenic) unsaturated carboxylic acid, for example, a polymerizable unsaturated monocarboxylic acid (such as (meth)acrylic acid), a polymerizable unsaturated polycarboxylic acid (such as itaconic acid, maleic acid, or fumaric acid), an acid anhydride of the polycarboxylic acid, a monoester of the polycarboxylic acid (e.g., a mono $C_{1-10}$alkyl ester of the polycarboxylic acid such as monoethyl maleate)] with an olefin (e.g., an α-$C_{2-10}$olefin such as ethylene or propylene).

These metal salts of the organic carboxylic acids may be used singly or in combination.

The preferred metal salt of the organic carboxylic acid includes a salt of an organic carboxylic acid with an alkaline earth metal (e.g., calcium acetate, calcium citrate, calcium stearate, magnesium stearate, and calcium 12-hydroxystearate), an ionomer resin (a resin in which at least a part of carboxyl groups contained in the copolymer of the polymerizable unsaturated polycarboxylic acid with the olefin is neutralized with an ion of the metal, and others. The ionomer resin is, for example, commercially available as ACLYN (manufactured by Allied Signal Inc.), Himilan (manufactured by Du Pont-Mitsui Polychemicals Co., Ltd.), Surlyn (manufactured by Du Pont), and others.

(c) Alkali or Alkaline Earth Metal Compound

The alkali or alkaline earth metal compound includes an inorganic compound exemplified by a metal oxide (such as CaO, or MgO), a metal hydroxide (such as $Ca(OH)_2$, or $Mg(OH)_2$), and a salt of an inorganic acid with a metal [e.g., a salt of an inorganic acid (such as a salt of carbonic acid with a metal (such as $Na_2CO_3$, $K_2CO_3$, $CaCO_3$ or $MgCO_3$), a borate, and a phosphate)]. In particular, the metal oxide and the metal hydroxide are preferred. Among the compounds, the alkaline earth metal compound is preferred.

These alkali or alkaline earth metal compounds may be used singly or in combination.

(d) Hydrotalcite

As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

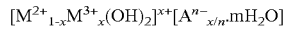

$$[M^{2+}{}_{1-x}M^{3+}{}_x(OH)_2]^{x+}[A^{n-}{}_{x/n}.mH_2O]$$

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3{}^{2-}$, $OH^-$, $HPO_4{}^{2-}$, $SO_4{}^{2-}$, or any of other n-valent anions (particularly, monovalent or divalent anion); x is 0<x<0.5; and m is $0 \leq m<1$.

These hydrotalcites may be used singly or in combination.

Incidentally, the hydrotalcite is available from Kyowa Chemical Industry Co., Ltd. under the trade name "DHT-4A", "DHT-4A-2", or "Alcamizer".

(e) Zeolite

The zeolite is not particularly limited to a specific one, and for example, a zeolite recited in Japanese Patent Application Laid-Open No. 62142/1995 (JP-7-62142A) [zeolites the smallest unit cell of which is a crystalline aluminosilicate with an alkaline and/or alkaline earth metal (A-, X-, Y-, L-, β-, and ZSM-type zeolites, mordenite-type zeolite; chabazite, mordenite, faujasite, and other natural zeolites)] can be employed.

These zeolites may be used singly or in combination.

Incidentally, A-type zeolite is available as "ZEOLAM-series (A-3, A-4, A-5)", "ZEOSTAR-series (KA100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd.

(f) Specific Acidic Compound

Examples of a compound used as the specific acidic compound may include a boric acid compound (e.g., orthoboric acid, and metaboric acid), a nitrogen-containing cyclic compound having a hydroxyl group (e.g., cyanuric acid, isocyanuric acid, ammeline, ammelide, barbituric acid, and uric acid), a carboxyl group-containing compound [for example, a hydroxycarboxylic acid such as glycolic acid; a homo- or copolymer of (meth)acrylic acid, such as a poly (meth)acrylic acid; a copolymer of (meth)acrylic acid and other copolymerizable monomer (e.g., an olefinic monomer such as ethylene or propylene), such as a (meth)acrylic acid-olefin copolymer; an olefin modified with an unsaturated carboxylic acid (anhydride); and a carboxyl group-containing compound described in Japanese Patent Publication No. 239484/2000 (JP-2000-239484A), having a pKa of not less than 3.6], a (poly)phenol (e.g., a phenol compound such as phenol or methyl phenol; a polyphenol such as lignin or catechin; and a novolak resin, a polyvinyl phenol), an aminocarboxylic acid(e.g., amino acid), and others. These acidic compounds may be used singly or in combination.

These heat stabilizers may be used alone or in combination. In the case of using the basic nitrogen-containing compound in combination with at least one member selected from the group consisting of the metal salt of an organic carboxylic acid, the alkali or alkaline earth metal compound, the hydrotalcite, the zeolite and the specific acidic compound, heat stability can be also imparted to the resin composition at a small amount of the heat stabilizer.

The proportion of the heat stabilizer may be selected from the range of about 0 to 5 parts by weight (e.g., about 0.001 to 5 parts by weight), and preferably about 0.001 to 3 parts by weight (particularly about 0.01 to 2 parts by weight), relative to 100 parts by weight of the polyacetal resin. In particular, in the case of using the basic nitrogen-containing compound as the heat stabilizer, the amount of the basic nitrogen-containing compound may be selected from the range of about 0.001 to 1 part by weight, and preferably 0.005 to 0.5 part by weight (particularly about 0.01 to 0.15 part by weight), relative to 100 parts by weight of the polyacetal resin.

[Additive]

Moreover, the polyacetal resin composition of the present invention may further contain at least on additive selected from the group consisting of a weather (light)-resistant stabilizer, a coloring agent (or colorant), a gloss control agent, an impact resistance improver (or impact modifier), an agent for improving sliding property (or slide improver), and a filler.

(Weather (Light)-Resistant Stabilizer)

The weather (light)-resistant stabilizer may include a benzotriazole-series compound, a benzophenone-series compound, an aromatic benzoate-series compound, a cyanoacrylate-series compound, an oxalic anilide-series compound, a hindered amine-series compound, and others. These weather (light)-resistant stabilizers may be used singly or in combination.

(a) Benzotriazole-Series Compound

Examples of the benzotriazole-series compound may include a benzotriazole compound having an aryl group substituted with a hydroxyl group and an alkyl ($C_{1-6}$alkyl) group, such as 2-(2'-hydroxy-5'-methylphenyl)benzotriazole, 2-(2'-hydroxy-3',5'-di-t-butylphenyl)benzotriazole, 2-(2'-hydroxy-3',5'-di-t-amylphenyl)benzotriazole or 2-(2'-hydroxy-3',5'-di-isoamylphenyl)benzotriazole; a benzotriazole compound having an aryl group substituted with a hydroxyl group and an aralkyl (or aryl) group, such as 2-[2'-hydroxy-3',5'-bis($\alpha,\alpha$-dimethylbenzyl)phenyl]benzotriazole; a benzotriazole compound having an aryl group substituted with a hydroxyl group and an alkoxy ($C_{1-12}$ alkoxy) group, such as 2-(2'-hydroxy-4'-octoxyphenyl)benzotriazole; and others. These benzotriazole-series compound may be used singly or in combination. Among these benzotriazole-series compounds, the benzotriazole-series compound includes a benzotriazole compound having a $C_{6-10}$aryl (particularly, phenyl) group substituted with a hydroxyl group and a $C_{3-6}$alkyl group, as well as a benzotriazole compound having an aryl group substituted with a hydroxyl group and a $C_{6-10}$aryl-$C_{1-6}$alkyl (particularly, phenyl-$C_{1-4}$alkyl) group.

(b) Benzophenone-Series Compound

Exemplified as the benzophenone-series compound may be a benzophenone compound having a plurality of hydroxyl groups (e.g., a di- to tetrahydroxybenzophenone such as 2,4-dihydroxybenzophenone; a benzophenone compound having a hydroxyl group, and an aryl or aralkyl group substituted with a hydroxyl group, such as 2-hydroxy-4-oxybenzylbenzophenone); a benzophenone compound having a hydroxyl group and an alkoxy ($C_{1-16}$alkoxy) group (e.g., 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone); and others. These benzophenone-series compounds may be used alone or in combination. Among these benzophenone-series compounds, the benzophenone-series compound preferably includes a benzophenone compound having a hydroxyl group, and a $C_{6-10}$aryl (or $C_{6-10}$aryl-$C_{1-4}$alkyl) group substituted with a hydroxyl group, particularly one having a hydroxyl group, and a phenyl-$C_{1-2}$alkyl group substituted with a hydroxyl group.

(c) Aromatic Benzoate-Series Compound

The aromatic benzoate-series compound may include an alkylphenylsalicylate such as p-t-butylphenylsalicylate or p-octylphenylsalicylate. These aromatic benzoate-series compounds may be used singly or in combination.

(d) Cyanoacrylate-Series Compound

Exemplified as the cyanoacrylate-series compound may be a cyano group-containing diarylacrylate such as 2-ethylhexyl-2-cyano-3,3-diphenylacrylate or ethyl-2-cyano-3,3-diphenylacrylate. These cyanoacrylate-series compounds may be used singly or in combination.

(e) Oxalic Anilide-Series Compound

The oxalic anilide-series compound may include, for example, an oxalic diamide compound having an aryl group on a nitrogen atom in which the aryl group may have a substituent(s), exemplified by N-(2-ethylphenyl)-N'-(2-ethoxy-5-t-butylphenyl)oxalic diamide, and N-(2-ethylphenyl)-N'-(2-ethoxy-phenyl)oxalic diamide. These oxalic anilide-series compounds may be used alone or in combination.

(f) Hindered Amine-Series Compound

The hindered amine-series compound may include a piperidine derivative having a steric hindrance group, for example, an ester group-containing piperidine derivative [for example, an aliphatic acyloxypiperidine (e.g., a $C_{2-20}$aliphatic acyloxy-tetramethylpiperidine) such as 4-acetoxy-2,2,6,6-tetramethylpiperidine, 4-stearoyloxy-2,2,6,6-tetramethylpiperidine or 4-acryloyloxy-2,2,6,6-tetramethylpiperidine; an aromatic acyloxypiperidine (e.g., a $C_{7-11}$aromatic acyloxytetramethylpiperidine) such as 4-benzoyloxy-2,2,6,6-tetramethylpiperidine; an aliphatic di- or tricarboxylic acid-bis- or trispiperidyl ester (e.g., a $C_{2-20}$aliphatic dicarboxylic acid-bispiperidyl ester) such as bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(1,2,2,6,6-pentamethyl-4-piperidyl)adipate, bis(2,2,6,6-tetramethyl-4-piperidyl)sebacate, bis(1,2,2,6,6-pentamethyl-4-piperidyl)sebacate or bis(1-octyloxy-2,2,6,6-tetramethyl-4-piperidyl)sebacate); an aromatic di- to tetracarboxylic acid-bis- to tetrakispiperidyl ester (e.g., an aromatic di- or tricarboxylic acid-bis- or trispiperidyl ester) such as bis(2,2,6,6-tetramethyl-4-piperidyl)terephthalate or tris(2,2,6,6-tetramethyl-4-piperidyl)benzene-1,3,5-tricarboxylate], an ether group-containing piperidine derivative [for example, a $C_{1-10}$alkoxypiperidine (e.g., a $C_{1-6}$alkoxytetramethylpiperidine) such as 4-methoxy-2,2,6,6-tetramethylpiperidine; a $C_{5-8}$cycloalkyloxy-piperidine such as 4-cyclohexyloxy-2,2,6,6-tetramethylpiperidine; an aryloxypiperidine such as 4-phenoxy-2,2,6,6-tetramethylpiperidine; a $C_{6-10}$aryl-$C_{1-4}$alkyloxy-piperidine such as 4-benzyloxy-2,2,6,6-tetramethylpiperidine; or an alkylenedioxybispiperidine (e.g., a $C_{1-10}$alkylenedioxybispiperidine) such as 1,2-bis(2,2,6,6-tetramethyl-4-piperidyloxy)ethane], an amide group-containing piperidine derivative [for example, a carbamoyloxypiperidine such as 4-(phenylcarbamoyloxy)-2,2,6,6-tetramethylpiperidine; an alkylenedioxy-bis piperidine substituted with a carbamoyloxy group, e.g., bis(2,2,6,6-tetramethyl-4-piperidyl)hexamethylene-1,6-dicarbamate]. Moreover, the hindered amine-series compound also includes, for example, a polycondensate of piperidine derivatives having high molecular weight (e.g., a polycondensate of dimethyl succinate and 1-(2-hydroxyethyl)-4-hydroxy-2,2,6,6-tetramethylpiperidine). These hindered amine-series compounds may be used singly or in combination.

Among these hindered amine-series compounds, for example, the ester group-containing piperidine derivative, in particular, an aliphatic carboxylic acid-piperidyl ester (preferably a $C_{2-16}$aliphatic dicarboxylic acid-bispiperidyl ester, and more preferably a $C_{6-14}$aliphatic dicarboxylic acid-bis (tetramethylpiperidyl) ester), and an aromatic di- or tricarboxylic acid-bis- or trispiperidyl ester are preferred.

The weather (light)-resistant stabilizers may be used singly or in combination.

The proportion of the weather (light)-resistant stabilizer is about 0.01 to 5 parts by weight, preferably about 0.01 to 3 parts by weight, and more preferably about 0.1 to 2 parts by weight, relative to 100 parts by weight of the polyacetal resin.

(Coloring Agent)

As the coloring agent, various dyes or pigments may be used. As the dye, a solvent dye is preferred, and includes, for example, an azo-series dye, an anthraquinone-series dye, a phthalocyanine-series dye or a naphthoquinone-series dye. The pigment may be an inorganic pigment or an organic pigment.

Exemplified as the inorganic pigment may be a titanium-series (titanium-containing) pigment, a zinc-series (zinc-containing)pigment, a carbon black(e.g., a furnace black, a channel black, an acetylene black, and Ketjen black), an iron-series (iron-containing) pigment, a molybdenum-series (molybdenum-containing) pigment, a cadmium-series (cadmium-containing) pigment, a lead-series (lead-containing) pigment, a cobalt-series (cobalt-containing) pigment, and an aluminum-series (aluminum-containing) pigment.

The organic pigment may include an azo-series pigment, an anthraquinone-series pigment, a phthalocyanine-series pigment, a quinacridone-series pigment, a perylene-series pigment, a perinone-series pigment, an isoindoline-series pigment, a dioxazine-series pigment, or a threne-series pigment.

The coloring agent may be used singly, or a plurality of these coloring agents may be used in combination. The use of a coloring agent having a high light-shielding effect [such as a carbon black, a titanium white (a titanium oxide), a phthalocyanine-series pigment, a perylene-series pigment (particularly a carbon black, a perylene-series black pigment)] ensures improvement in weather (light)-resistance of the polyacetal resin composition.

The content of the coloring agent is, for example, about 0 to 5 parts by weight (e.g., about 0.01 to 5 parts by weight), preferably about 0.1 to 4 parts by weight, and more preferably about 0.1 to 2 parts by weight, relative to 100 parts by weight of the polyacetal resin.

(Impact Resistance Improver)

The impact resistance improver may include an acrylic core-shell polymer (e.g., a core-shell polymer described in Japanese Patent Application Laid-Open No. 26705/2000 (JP-12-26705A)), a polyurethane-series resin, a polyester-series resin (a thermoplastic polyester), a styrenic elastomer [e.g., a styrene-butadiene-styrene (SBS) block copolymer, a styrene-isoprene-styrene (SIS) block copolymer, a styrene-ethylene.butylene-styrene (SEBS) block copolymer, a styrene-isoprene-propylene-styrene (SIPS) block copolymer, a styrene-ethylene.propylene-styrene (SEPS) block copolymer, an acrylonitrile-butadiene-styrene (ABS) resin, and an acrylonitrile-ethylene.propylene-styrene (AES) resin], and others. These impact resistance improvers may be used singly or in combination.

The proportion of the impact resistance improver may be about 0 to 100 parts by weight (e.g., about 1 to 100 parts by weight), preferably about 2 to 75 parts by weight, and more preferably about 3 to 60 parts by weight, relative to 100 parts by weight of the polyacetal resin.

(Gloss Control Agent)

The gloss control agent may include a gloss reducing agent, and as the gloss reducing agent, a resin (including an elastomer) exemplified in the paragraph of the impact resistance improver may be used. Moreover, an acrylic resin [e.g., a homo- or copolymer of a poly(alkyl (meth)acrylate) (e.g., a poly(methyl methacrylate)), an acrylonitrile-styrene copolymer (AS resin), and an acrylonitrile-ethylene·propylene-styrene (AES) resin], a styrenic resin (e.g., a polystyrene) may be used as a brightener (brightening agent). These gloss control agents may be used singly or in combination.

The proportion of the gloss control agent is, for example, about 0 to 30 parts by weight (e.g., about 0.01 to 20 parts by weight), preferably about 0.02 to 10 parts by weight, and more preferably about 0.05 to 5 parts by weight, relative to 100 parts by weight of the polyacetal resin.

(Agent for Improving Sliding Property)

The agent for improving sliding property (or slide improver) may include, for example, an olefinic resin, a silicone-series resin, a fluorine-containing resin, a polyalkylene glycol resin, a calcium carbonate, and a talc. The impact resistance improver may be used singly or in combination.

The proportion of the slide improver may be about 0 to 50 parts by weight (e.g., about 0.1 to 50 parts by weight), preferably about 1 to 30 parts by weight, and more preferably 3 to 20 parts by weight, relative to 100 parts by weight of the polyacetal resin.

(Filler)

If necessary, the resin composition may be further blended with one or combination of a conventional filler (such as a fibrous, plate-like or particulate filler) to improve properties of the shaped article of the present invention. Examples of the fibrous filler include an inorganic fiber (e.g., a glass fiber, a carbon fiber, a boron fiber, and a potassium titanate fiber (whisker)), an organic fiber (e.g., an amide fiber), and others. As the plate-like filler, there may be mentioned a glass flake, a mica, a graphite, a variety of metal foil, and others. Examples of the particulate filler include a metal oxide (e.g., zinc oxide, and alumina), a sulfate (e.g., calcium sulfate, and magnesium sulfate), a carbonate (e.g., calcium carbonate), a glass (e.g., a milled fiber, a glass bead, and a glass balloon), a silicate (e.g., a talc, a kaolin, a silica, a diatomite, a clay, and a wollastonite), a sulfide (e.g., molybdenum disulfide, tungsten disulfide, and zinc sulfide), a carbide (e.g., graphite fluoride, and silicon carbide), boron nitride, and others.

The proportion of the filler may be adjusted for any filler species or any blending purpose. For example, in order to improve the mechanical properties of the polyacetal resin (e.g., strength and rigidity), the proportion of the filler may be about 0 to 200 parts by weight (e.g., about 1 to 200 parts by weight), preferably about 1 to 100 parts by weight, and more preferably 3 to 70 parts by weight, relative to 100 parts by weight of the polyacetal resin.

To the polyacetal resin composition of the present invention may be optionally added a conventional additive(s) singly or in combination. As the additive, there may be mentioned a mold-release agent (releasing agent), a nucleating agent, an antistatic agent, a flame retardant, a surfactant, an antibacterial agent, an antifungal agent, an aromatic agent, a perfume, various polymers [e.g., an acrylic resin (a homo- or copolymer of a $C_{1-10}$alkyl(meth)acrylate such as a poly(methyl methacrylate)), an acrylic core-shell polymer, a polycarbonate-series resin, a polyolefinic resin, a polyurethane-series elastomer or resin, a polyester-series elastomer or resin, a polyamide-series elastomer or resin, a fluorine-containing resin, and a silicone-series elastomer or resin], and others.

(Production Process of Polyacetal Resin Composition)

The polyacetal resin composition of the present invention may be a particulate mixture or a molten mixture, and it can be prepared by mixing a polyacetal resin with an antioxidant, the above-mentioned guanamine compound, and a processing stabilizer and/or a heat stabilizer, and if necessary, other additives, in a conventional manner. For example, (1) a process comprising feeding each component from a main feeder, kneading and extruding the resulting mixture into pellets with a uniaxial or biaxial extruder, and molding the pellets, (2) a process comprising feeding a component free from the guanamine compound from a main feeder, feeding a component containing at least the guanamine compound (as other components, there may be mentioned a polyacetal resin, a stabilizer, other additives, and the like) from a side feeder, kneading and extruding the resulting mixture into pellets with a uniaxial or biaxial extruder, and molding the pellets, (3) once making pellets (master batch) different in composition, mixing (diluting) the pellets in a certain ratio, and molding the resulting pellets to give a shaped article having a certain composition, or (4) a process comprising allowing an inhibitor (or suppressant) to coexist with or adhere to a pelletized polyacetal resin by for example spraying or surface-coating, and molding the resulting pellets to give a shaped article having a certain composition is utilized. Moreover, in the preparation of a composition for use in a shaped article, mixing of a powdered (particulate) polyacetal as a substrate (e.g., a powder (particulate) obtained by grinding a part or all of the polyacetal resin) with other components (e.g., an antioxidant, a processing stabilizer, a heat stabilizer, a guanamine compound) followed melt-kneading improves the dispersion of the additives and therefore is advantageous.

In particular, in the case of using a urea-series compound (particularly, biurea, allantoin, a metal salt of allantoin) and/or a hydrazine compound (especially, a carboxylic acid hydrazide) as a basic nitrogen-containing compound in combination in addition to the guanamine compound of the present invention, and preparing a polyacetal resin composition by melt-mixing using an extruder, it is preferred to prepare the composition by (a) feeding at least the basic nitrogen-containing compound through the middle (or midstream) part of the extruder (e.g., the upstream or the downstream from the exhaust port) and mixing the compound with other components, and/or (b) melt-extruding components by setting up an average residence time of the resin in the extruder as not longer than 300 seconds (e.g., setting up an average residence time of the polyacetal resin as 10 to 200 seconds in the case of adding the basic nitrogen-containing compound through the main feed port and/or the side feed port of the extruder). Further, as the extruder, any monoaxial or biaxial extruders may be applicable, and an extruder provided with exhaust port(s) not less than one may be preferably used. For example, after removing volatile component(s) from exhaust port(s) in vacuo (e.g., at a vent vacuum degree of 1 to 500 mmHg (0.13 to 66.7 kPa), and usually, 5 to 300 mmHg (0.67 to 40 kPa)), additive(s) containing at least the basic nitrogen-containing compound may be added thereto through the middle part (side feed port) of the extruder.

The polyacetal resin composition of the present invention realizes that the emission of formaldehyde due to oxidation or thermal decomposition or the like of the polyacetal resin is remarkably restrained or inhibited and that the working environment is improved or ameliorated particularly in the molding and processing (particularly, a melt-molding and processing) step. Moreover, deposition of decomposition products or additives on the mold (mold deposit), blooming or bleeding of such products or additives from a shaped article can be remarkably restricted or inhibited, and various problems on the molding and processing step can be overcome.

(Shaped Article)

The polyacetal resin-shaped article of the present invention can be produced by molding (or forming) the polyacetal resin composition. The molding may be carried out by a conventional molding method, for example, injection molding, extrusion molding, compression molding, blow molding, vacuum molding, foam molding, rotation molding, and gas injection molding.

The polyacetal resin-shaped article of the present invention formed from the above-mentioned polyacetal resin composition comprises (contains) an antioxidant, a specific guanamine compound, and if necessary a processing stabilizer and/or a heat stabilizer in combination, and has excellent stability in an extrusion and/or molding process with having extremely small amount of emission (or generation) of formaldehyde. In other words, shaped articles molded from the conventional polyacetal resins containing antioxidants and other stabilizers liberate relatively large amounts of formaldehyde, cause corrosion and discoloration, and contaminate the living and working environment. For example, the formaldehyde emission from commercial ordinary polyacetal resin articles is about 2 to 5 μg per one cm$^2$ of surface area under dry conditions (in a constant-temperature dry atmosphere) and about 3 to 6 μg per one cm$^2$ of surface area under humid conditions (in a constant-temperature moisture-laden atmosphere).

On the other hand, in the polyacetal resin-shaped article of the present invention, the amount of the formaldehyde emission is not more than 1.5 μg per one cm$^2$ of surface area of the shaped article under dry conditions, preferably about 0 to 1.3 μg, more preferably about 0 to 1 μg, and usually about 0.01 to 1 μg. Moreover, in humid conditions, the formaldehyde emission is not more than 2.5 μg per one cm$^2$ of surface area of the shaped article, preferably about 0 to 1.7 μg, more preferably about 0 to 1.5 μg, and usually about 0.01 to 1.5 μg.

The formaldehyde emission under dry conditions can be determined as follows.

After the shaped article of polyacetal resin is cut if necessary and its surface area is measured, a suitable portion of the article (e.g., the amount equivalent to a surface area of about 10 to 50 cm$^2$) is placed in a vessel (20 ml capacity) to seal and stand (or maintained) at a temperature of 80° C. for 24 hours. Then, this sealed vessel is charged with 5 ml of water and the formaldehyde in the aqueous solution is assayed in accordance with JIS (Japanese Industrial Standards) K0102, 29 (under the heading of Formaldehyde) to calculate the formaldehyde emission per unit surface area of the shaped article (μg/cm$^2$).

The formaldehyde emission under humid conditions can be determined as follows.

After the shaped article of a polyacetal resin is cut if necessary and its surface area is measured, a suitable portion of the shaped article (e.g., the amount equivalent to a surface area of about 10 to 100 cm$^2$) is suspended from the lid of a sealable vessel (1 L capacity) containing 50 ml of distilled water. After seal of the vessel, the vessel is allowed to stand (or maintained) in a constant temperature oven at 60° C. for 3 hours. Thereafter, the vessel is allowed to stand at room temperature for 1 hour and the formaldehyde in the aqueous solution within the vessel is assayed in accordance with JIS K0102, 29 (under the heading of Formaldehyde) to calculate the formaldehyde emission per unit surface area of the article (μg/cm$^2$).

The above quantitative limitation on formaldehyde emission in the present invention is valid as for the polyacetal resin, the antioxidant and the specific guanamine compound are contained not only for shaped articles available from polyacetal resin compositions comprising the conventional additive(s) (e.g., a processing stabilizer, a heat stabilizer, a weather (light)-resistant stabilizer, a coloring agent, a gloss control agent, an impact resistance improver, an agent for improving sliding property, a filler, a conventional stabilizer, and a releasing agent), but also for shaped articles molded from comparable resin compositions containing an inorganic filler and/or other polymers, even if only a major part of the surface of the article (for example, 50 to 100% of the total surface area) is constituted by the polyacetal resin (for example, a multi-colored article or a coated article).

Since the polyacetal resin composition of the present invention comprises the antioxidant and the specific guanamine compound, the polyacetal resin composition achieves extensive improvement of thermal stability in an extruding and shaping or molding process of the polyacetal resin. Further, addition of a small amount of the above-mentioned components enables to suppress or inhibit formaldehyde emission from the polyacetal resin and an article thereof, resulting in the emission at an extremely low level, and enables to excellently improve the circumferential environment (e.g., working environment and using environment). Furthermore, the polyacetal resin composition of the present invention can inhibit emission of formaldehyde even under severe conditions to suppress: deposition of decomposition products on the mold (mold deposit); blooming or bleeding of such products from a shaped article; and thermal aging or deterioration of the article, thus contributing to upgrading of the quality and moldability of the shaped article. Further, properties of the polyacetal resin can be also improved by adding the weather (light)-resistant stabilizer, the impact resistance improver, or others.

INDUSTRIAL APPLICABILITY

The shaped article according to the present invention finds application in any field of use where formaldehyde is objectionable and can also be used advantageously as parts and members in a variety of fields inclusive of automotive parts, electrical and electronic component (driving component and driven component) parts, architectural members and pipeline installation parts, household and cosmetic product parts, medical device (for diagnostic or therapeutic use) parts, and photographic parts.

More specifically, the automotive parts include but are not limited to car interior parts such as the inner handle, fuel trunk opener, seat belt buckle, assist lap, various switches, knob, lever, and clip; electrical system parts such as meters and connectors; in-vehicle electrical and electronic parts or mountings related to audio equipment and car navigation equipment, parts in contact with metals, typically the window regulator carrier plate, mechanical parts such as door lock actuator parts, mirror parts, wiper motor system parts, and fuel system parts.

The electrical or electronic component parts (the mechanical parts) includes, for example, parts or members constituted with shaped articles of polyacetal resin articles and fitted with a number of metal contacts [e.g. audio equipment such as the cassette tape recorder, video equipment such as the video tape recorder (VTR), 8 mm or other video camera, etc., office automation (OA) equipment such as copying machines, facsimile, word processor, computer, toys actuated by the driving force of an electric motor or a spring, a telephone, a keyboard as an accessory to a computer or the like]. To be specific, there can be mentioned the chassis, gear, lever, cam, pulley, and bearing. Furthermore, the invention is applicable to optical and magnetic recording medium parts at least partly made of molded polyacetal resin (e.g. metal thin-film magnetic tape cassette, magnetic disk cartridge, opticomagnetic disc cartridge, etc.) and more particularly, the metal tape cassette for music, digital audio tape cassette, 8 mm video tape cassette, floppy (registered trademark) disk cartridge, minidisk cartridge, etc. As specific optical and magnetic medium parts, there can be mentioned tape cassette parts (tape cassette body, reel, hub, guide, roller, stopper, lid, etc.) and disk cartridge parts (disk cartridge body (case), shutter, cramping plate, etc.).

In addition, the shaped article of a polyacetal resin according to the present invention can be used with advantage in architectural members and pipeline parts such as lighting equipment parts, interior architectural members (such as fittings, fixtures, furnishings), piping, cock, faucet, rest room (lavatory)-related parts, etc., a broad range of products related to daily living, cosmetic products, medical devices, and photographic devices, for example fastener (such as slide fastener, snap fastener, hoop-and-loop fastener, rail fastener), stationery, chapstick or lipstick cases, cleansing device, water cleaner, spray nozzle, spray device or container, aerosol container, general vessels, syringe holder, parts for (digital) camera, and peripheral parts (or member) of films.

EXAMPLES

The following examples are intended to describe this invention in further detail and should by no means be interpreted as defining the scope of the invention.

Incidentally, referring to the examples and comparative examples, moldability (the amount of the deposit on the mold), the amount of emission of formaldehyde from the molded (or shaped) articles under dry conditions, and weather (light)-resistance were evaluated based on the following methods.

[Moldability (the Amount of the Deposit on the Mold)]

A pellet formed with a polyacetal resin composition was continuously or successively shaped or molded by using a injection molding machine (1,000 shots) to obtain a certain-shaped article (20 mm in diameter and 1 mm in thickness), and the degree of the deposition on the mold was evaluated and classified into five grades. Incidentally, the smaller the number of the grade is, the lower or smaller the amount of the deposit is, namely the lower or smaller the amount of the mold deposit is.

[Amount of Formaldehyde Emission from Shaped Article in Dry Conditions]

Each resin sample consisting of 10 test pieces (one test piece: 2 mm×2 mm×50 mm; total surface area: about 40 $cm^2$) was placed in a vessel (capacity 20 ml) to seal and heated in a constant temperature oven at 80° C. for 24 hours. After air-cooling to room temperature, 5 ml of distilled water was injected into the vessel using a syringe. The formaldehyde content of this aqueous solution was determined in accordance with JIS K0102, 29 (under the heading of Formaldehyde) and the formaldehyde gas emission per surface area ($\mu g/cm^2$) was calculated.

[Amount of Formaldehyde Emission from Shaped Article in Humid Conditions]

A plate test piece (100 mm×40 mm×2 mm; total surface area of 85.6 $cm^2$) was suspended from the stopper or lid of a polyethylene bottle (capacity 1000 ml) containing 50 ml of distilled water. The bottle was sealed to stand in a constant temperature oven at 60° C. for 3 hours, followed by standing for 1 hour at room temperature. The amount of formaldehyde absorbed into distilled water in the bottle was determined in accordance with JIS K0102, 29 (under the heading of Formaldehyde) and the formaldehyde gas emission per surface area of the test piece ($\mu g/cm^2$) was calculated.

[Additive Bleeding (or Blooming Property)]

The shaped article (20 mm in diameter and 1 mm in thickness) was subjected to heat treatment at 130° C. for 5 hours in a gear oven. Then, the surface of the shaped article was visually observed to evaluate in the degree of bleeding, and classified into following three grades.

"A": no bleeding was observed
"B": slight bleeding was observed
"C": extremely heavy bleeding was observed

[Weather (Light)-Resistance]

A plate-molded article (70 mm×40 mm×3 mm) was subjected to an irradiation test with a weather meter [manufactured by SugaTest Instruments Co., Ltd., WEL-SUN-HCH type] for 600 hours in a fade condition at 83° C. The change of color and the change of gloss between before and after the irradiation were observed, then evaluated and classified into five grades, respectively. The smaller the number of the grade is, the smaller the degree of the change is, namely the smaller the deterioration of gloss and the degree of discoloration are.

[Impact Strength Test]

In accordance with ISO 179/leA, Charpy impact strength (with notch) was evaluated.

Examples 1 to 31 and Comparative Examples 1 to 5

With 100 parts by weight of a polyacetal resin were mixed an antioxidant, a weather (light)-resistant stabilizer, a guanamine compound, a coloring agent, a processing stabilizer, and a heat stabilizer in the proportions indicated in Tables 1 and 2. Then, concerning each of thus obtained mixtures, the mixture was melt-mixed by a biaxial extruder (30 mm diameter) having one exhaust vent port to prepare a pelletized composition (extrusion condition: extrusion temperature=200° C., screw rotation frequency=100 rpm, vent vacuum=20 mmHg (2.67 kPa), discharging rate=15 kg/hr, and average residence time=100 seconds). From the pellets, prescribed test pieces were fabricated with an injection molding machine, and the mold deposit and additive bleeding on molding were evaluated. Moreover, the amount of emission of formaldehyde from each of prescribed test pieces was measured. Further, the weather (light)-resistance of the prescribed test piece was evaluated. The results are shown in Tables 1 and 2.

For comparison, samples prepared without addition of the guanamine compound were evaluated in the same manner described above. The results are shown in Table 3.

Examples 32 to 43

A given amount of a heat stabilizer "i" was added to and mixed with each of pelletized resin compositions prepared in Examples 1, 2, 19 and 20. From the resulting mixture, prescribed test pieces were fabricated with an injection molding machine. The mold deposit and additive bleeding on molding were evaluated. Moreover, the amount of emission of formaldehyde from the prescribed test piece was measured. Further, in Examples 38 and 43, weather (light)-resistance of the molded prescribed test piece was evaluated. The results are shown in Table 4.

Examples 44 and 45

To a pelletized resin composition prepared in Comparative Example 1 were added and mixed a given amount of a guanamine compound "c" and a given amount of a heat stabilizer "i". From the resulting mixture, prescribed test pieces were fabricated with an injection molding machine. The mold deposit and additive bleeding on molding were evaluated. Moreover, the amount of emission of formaldehyde from the prescribed test piece was measured. The results are shown in Table 4.

Example 46

A guanamine compound "c" and a heat stabilizer "i" were added in the given amounts to a pelletized resin composition prepared in Comparative Example 4, and mixed together. The resulting mixture was supplied to an injection molding machine to mold prescribed test pieces. The mold deposit and additive bleeding on molding were evaluated. Moreover, the amount of emission of formaldehyde from the prescribed test piece was measured. Further, the weather (light)-resistance of the molded prescribed test piece was evaluated. The results are shown in Table 4.

Examples 47 to 50 and Comparative Examples 6 to 8

With 100 parts by weight of a polyacetal resin were preblended an antioxidant, a guanamine compound, a processing stabilizer, and a heat stabilizer in the proportions indicated in Table 5. The resulting preblended material was charged via a main feed port of a biaxial extruder (30 mm diameter) having one exhaust vent port to prepare a pelletized composition under the following melt-mixing conditions (extrusion condition: extrusion temperature=200° C., screw rotation frequency=100 rpm, vent vacuum=20 mmHg (2.67 kPa), discharging rate=15 kg/hr, and average residence time=100 seconds).

Using the pelletized composition, prescribed test pieces were fabricated with an injection molding machine, and the mold deposit and the amount of formaldehyde emission under dry and humid conditions were evaluated. The results are shown in Table 5.

Examples 51 to 56

With 95 parts by weight of a polyacetal resin were mixed an antioxidant, a weather (light)-resistant stabilizer, a coloring agent, a processing stabilizer, and a heat stabilizer (h) in the proportions indicated in Table 5 to prepare a preblended material. The preblended material was charged via a main feed port of a biaxial extruder (30 mm diameter) having one exhaust vent port to melt-mix the material (extrusion condition: extrusion temperature=200° C., screw rotation frequency=100 rpm, vent vacuum=20 mmHg (2.67 kPa), discharging rate=15 kg/hr, and average residence time=100 seconds), as well as a blended material (containing 5 parts by weight of the same polyacetal resin particulate, guanamine compound and heat stabilizer (i) as those mentioned above) was fed through the side feed port in the downstream of the exhaust vent port of the extruder to prepare a pelletized composition. Using the pelletized composition, prescribed test pieces were fabricated with an injection molding machine, and the mold deposit and the amount of formaldehyde emission under dry and humid conditions were evaluated. Moreover, in Example 56, the weather (light)-resistance was also evaluated. The results are shown in Table 5.

Examples 57, 59 to 61, and 63 to 65

With 95 parts by weight of a polyacetal resin were mixed an antioxidant, a weather (light)-resistant stabilizer, a coloring agent, a processing stabilizer, a heat stabilizer (h), and other additive in the proportions indicated in Table 6 to prepare a preblended material. The preblended material was charged via a main feed port of a biaxial extruder (30 mm diameter) having one exhaust vent port to melt-mix the material (extrusion condition: extrusion temperature=200° C., screw rotation frequency=100 rpm, vent vacuum=20 mmHg (2.67 kPa), discharging rate=15 kg/hr, and average residence time=100 seconds), as well as a blended material (containing 5 parts by weight of the same polyacetal resin particulate, guanamine compound and heat stabilizer (i) as those mentioned above) was fed through the side feed port in the downstream of the exhaust vent port of the extruder to prepare a pelletized composition. The pelletized composition was supplied to an injection molding machine to mold prescribed test pieces, and the mold deposit and the amount of formaldehyde emission under humid conditions were evaluated. Moreover, in Examples 57, and 59 to 61, the weather (light) resistance was evaluated, and in Examples 59 to 65, the impact resistance was also evaluated. The results are shown in Table 6.

Examples 58 and 62, and Comparative Examples 9 and 10

An antioxidant, a guanamine compound, a weather (light)-resistant stabilizer, a coloring agent, a processing stabilizer, a heat stabilizer, and other additive were preblended with 100 parts by weight of a polyacetal resin in the proportions indicated in Table 6. The resulting preblended material was charged via a main feed port of a biaxial extruder (30 mm diameter) having one exhaust vent port, and melt-mixed under the following conditions (extrusion condition: extrusion temperature=200° C., screw rotation frequency=100 rpm, vent vacuum=20 mmHg (2.67 kPa), discharging rate=15 kg/hr, and average residence time=100 seconds) to prepare a pelletized composition.

Using the pelletized composition, prescribed test pieces were fabricated with an injection molding machine, and the mold deposit, the amount of formaldehyde emission under humid conditions, and the impact resistance were evaluated. Moreover, in Example 58 and Comparative Example 9, the weather (light) resistance was also evaluated. The results are shown in Table 6.

Incidentally, the impact resistance in Comparative Example 1 was determined as 6.0 kJ/m$^2$.

Examples 66 and 67, and Comparative Example 11

With 100 parts by weight of a polyacetal resin were mixed an antioxidant, a guanamine compound, a processing stabilizer, a heat stabilizer, and other additive in the proportions indicated in Table 6 to prepare a preblended material. The preblended material was charged via a main feed port of a biaxial extruder (30 mm diameter) having one exhaust vent port to melt-mix the material (extrusion condition: extrusion temperature=200° C., screw rotation frequency=120 rpm, vent vacuum=20 mmHg (2.67 kPa), and discharging rate=15 kg/hr), as well as 33 parts of weight of other additive [a glass fiber (j-4)] was fed through the side feed port in the upstream of the exhaust vent port of the extruder to prepare a pelletized composition. Using the pelletized composition, prescribed test pieces were fabricated with an injection molding machine, and the mold deposit, the amount of formaldehyde emission under humid conditions, and the impact resistance were evaluated. The results are shown in Table 6.

The polyacetal resins, the antioxidants, the guanamine compounds, the weather (light)-resistant stabilizers, the coloring agents, the processing stabilizers, the heat stabilizers, and other additives used in the Examples and Comparative Examples are as follows.

1. Polyacetal Resin "a"

(a-1): Polyacetal resin copolymer (a resin stabilized by a molten-hydrolysis method, melt index=9 g/10 minutes; the resin was prepared by the following method.)

The following polymerization was carried out using a continuous mixing reactor provided with a barrel and two rotation axes, the barrel having a cross section of a shape two circles partly overlapped and being equipped with a jacket for passing a heating (or cooling) medium outside of the barrel, and the two rotation axes being provided with stirring and propelling paddles, respectively, in the longitudinal direction of the inside of the barrel.

Hot water (80° C.) was passed through the jacket, and the two rotation axes were rotated at a rate of 100 rpm, and 0.05% by weight of triethylene glycol bis[3-(3-t-butyl-5-methyl-4-hydroxyphenyl)propionate] as an antioxidant, 3.3% by weight of 1,3-dioxorane as a comonomer, and trioxane containing 700 ppm (based on weight) of methylal as a chain transfer agent were continuously fed to the reactor. In parallel, a solution (having a concentration of 1% by weight) that boron trifluoride butyl etherate was dissolved in cyclohexane was continuously added thereto at a concentration of 10 ppm (based on weight) as boron trifluoride relative to the total amount of the monomers (trioxane and 1,3-dioxorane) to copolymerize these monomers. Then, the resulting crude polyacetal resin copolymer exhausted from a discharge opening of the reactor was added to an aqueous solution containing 0.1% by weight of triethylamine to deactivate the catalyst. The mixture was centrifuged, and the obtained crude polyacetal resin copolymer was dried. To 100 parts by weight of the dried crude polyacetal resin copolymer was added 0.3 part by weight of triethylene glycol bis[3-(3-t-butyl-5-methyl-4-hydroxyphenyl)propionate], the mixture was fed to a biaxial extruder equipped with an exhaust port. An aqueous solution (concentration: 3% by weight) containing 2 parts by weight of triethylamine was injected relative to 100 parts by weight of the crude polyacetal resin copolymer molten within the extruder, and the mixture was melt-kneaded at a vent vacuum degree of 20 mmHg (2.67 kPa), a cylinder temperature of 200° C. and an average residence time of 300 seconds with the thermally decomposed product removing from the mixture through the (vent) exhaust port to give a pelletized polyacetal resin copolymer (a-1).

(a-2): Polyacetal resin copolymer (a resin stabilized by a solution-hydrolysis method, melt index=9 g/10 minutes; the resin was prepared by the following method.)

A copolymerization was conducted in the same manner as mentioned above by using the same reactor as used in the preparation of the copolymer (a-1), and a crude polyacetal copolymer was prepared.

The crude polyacetal resin copolymer exhausted from the discharge opening of the reactor was charged in a methanol aqueous solution containing 0.25% by weight of triethylamine, and subjected to a dissolving and heating treatment at 170° C. under pressure, and then the dissolved matter was cooled to precipitate a polyacetal resin copolymer. Then, the copolymer was centrifuged and dried to give a powdered polyacetal resin copolymer (a-2).

(a-3): Polyacetal resin composition prepared in Example 1
(a-4): Polyacetal resin composition prepared in Example 2
(a-5): Polyacetal resin composition prepared in Example 19
(a-6): Polyacetal resin composition prepared in Example 20
(a-7): Polyacetal resin composition prepared in Comparative Example 1
(a-8): Polyacetal resin composition prepared in Comparative Example 4
(a-9): Polyacetal resin copolymer (a resin stabilized by a molten-hydrolysis method, melt index=9 g/10 minutes; The resin was prepared by the following method.)

A copolymerization was carried out in the same manner as mentioned above by using the same reactor as used in the preparation of the copolymer (a-1), and a crude polyacetal copolymer was prepared.

The crude polyacetal resin copolymer exhausted from the discharge opening of the reactor was added to an aqueous solution containing 0.1% by weight of triethylamine to deactivate the catalyst. The mixture was subjected to centrifugation, and 1 part by weight of an aqueous solution containing 2% by weight of 2-hydroxyethyltrimethylammonium formate [(HOCH$_2$CH$_2$)Me$_3$N$^+$ HCOO$^-$] was uniformly added to and mixed with 100 parts by weight the crude polyacetal resin copolymer, and then the mixture was dried.

To 100 parts by weight of the resulting dried crude polyacetal resin copolymer was added 0.3 part by weight of triethylene glycol bis[3-(3-t-butyl-5-methyl-4-hydroxyphenyl)propionate], and the mixture was fed to a biaxial extruder equipped with an exhaust port. Three (3) parts by weight of water was injected relative to 100 parts by weight of the crude polyacetal resin copolymer molten within the extruder, and the mixture was melt-kneaded at a vent vacuum degree of 20 mmHg (2.67 kPa), a cylinder temperature of 200° C. and an average residence time of 300 seconds with the thermally decomposed product removing from the mixture through the (vent) exhaust port to give a pelletized polyacetal resin copolymer (a-9).

(a-10): Polyacetal resin copolymer (a resin stabilized by a molten-hydrolysis method, melt index=9 g/10 minutes; The resin was prepared by the following method.)

Using the same reactor as in the preparation of the copolymer (a-1), polymerization was conducted.

Hot water (80° C.) was passed through the jacket, the two rotation axes were rotated at a rate of 100 rpm, and 0.05% by weight of triethylene glycol bis[3-(3-t-butyl-5-methyl-4-hydroxyphenyl)propionate] as an antioxidant, 4.0% by weight of 1,3-dioxorane as a comonomer, and trioxane containing 700 ppm (based on weight) of methylal as a chain transfer agent were continuously fed to the reactor. In parallel, a solution containing trifluoromethanesulfonic acid dissolved in methyl formate (the concentration of trifluoromethanesulfonic acid: 1% by weight) was continuously added thereto at a concentration of 3 ppm (based on weight) as trifluoromethanesulfonic acid relative to the total amount of the monomers (trioxane and 1,3-dioxorane) to copolymerize these monomers.

Then, the resulting crude polyacetal resin copolymer exhausted from a discharge opening of the reactor was added to an aqueous solution containing triethylamine (concentration: 0.1% by weight) to deactivate the catalyst. The mixture was centrifuged, and 1 part by weight of an aqueous solution containing 2% by weight of 2-hydroxyethyltriethylammonium formate [(HOCH$_2$CH$_2$)Et$_3$N$^+$HCOO$^-$] was uniformly added to and mixed with 100 parts by weight the obtained crude polyacetal resin copolymer, and then the mixture was subjected to drying treatment.

To 100 parts by weight of the dried crude polyacetal resin copolymer was added 0.3 part by weight of triethylene glycol bis[3-(3-t-butyl-5-methyl-4-hydroxyphenyl)propionate], and the resulting matter was fed to a biaxial extruder equipped with an exhaust port. Water (3 parts by weight) was injected relative to 100 parts by weight of the crude polyacetal resin copolymer molten within the extruder, and the mixture was melt-kneaded at a vent vacuum degree of 20 mmHg (2.67 kPa), a cylinder temperature of 200° C. and an average residence time of 300 seconds with the thermally decomposed product removing from the mixture through the (vent) exhaust port to give a pelletized polyacetal resin copolymer (a-10).

Incidentally, in the above-mentioned polyacetal resin "a", the melt index was a value (g/10 minutes) determined under conditions of 190° C. and 2160 g in accordance with ASTM-D1238.

2. Antioxidant "b"
(b-1): Triethylene glycol bis[3-(3-t-butyl-5-methyl-4-hydroxyphenyl)propionate]
(b-2): Pentaerythritol tetrakis[3-(3,5-di-t-butyl-4-hydroxyphenyl)propionate]

3. Guanamine compound "c"
(c-1): 2,4-Diamino-6-(2'-methylimidazolyl-1')-ethyl-s-triazine [manufactured by Shikoku Chemicals Corp., "CUREZOL 2MZ-A"]
(c-2): 2,4-Diamino-6-(2'-undecylimidazolyl-1')-ethyl-s-triazine [manufactured by Shikoku Chemicals Corp., "CUREZOL C11Z-A"]
(c-3): 2,4-Diamino-6-(2'-ethyl-4'-methylimidazolyl-1')-ethyl-s-triazine [manufactured by Shikoku Chemicals Corp., "CUREZOL 2E4MZ-A"]
(c-4): 3-[β-(2',4'-Diamino-s-triazin-6-yl)ethyl]-5,5-dimethylhydantoin [prepared based on Example 6 of Japanese Patent Application Laid-Open No. 154181/2000 (JP-2000-154181A)]
(c-5): Tetrakis[β-(2',4'-diamino-s-triazin-6-yl)ethyl]ethylenediamine [prepared based on Example 8 of Japanese Patent Application Laid-Open No. 154181/2000 (JP-2000-154181A)]
(c-6): Salt of 2,4-Diamino-6-(2'-methylimidazolyl-1')-ethyl-s-triazine with isocyanuric acid
(c-7): Tris[β-(2,4-diamino-s-triazin-6-yl)ethyl]isocyanurate
(c-8): Bis[β-(2,4-diamino-s-triazin-6-yl)ethyl]isocyanurate
(c-9): 2,4-Diamino-6-(2'-phenylimidazole-1')-ethyl-s-triazine 4. Weather (light)-resistant stabilizer "d"
(d-1): 2-(2'-Hydroxy-3',5'-di-t-amylphenyl)benzotriazole
(d-2): 2-Hydroxy-4-oxybenzylbenzophenone
(d-3): 2-[2'-Hydroxy-3',5'-bis(α,α-dimethylbenzyl)phenyl]benzotriazole 5. Weather (light)-resistant stabilizer "e"
(e-1): Bis(2,2,6,6-tetramethyl-4-piperidyl)sebacate 6. Coloring agent "f"
(f-1): Carbon black (acetylene black)
(f-2): Phthalocyanine blue pigment
(f-3): Titanium oxide 7. Processing stabilizer "g"
(g-1): Ethylene bis-stearyl amide
(g-2): Glycerin monostearate (g-3): Polyethylene glycol monostearate (manufactured by NOF Corporation, "NONION S-40")
(g-4): Ethylene glycol distearate
(g-5): Polyethylene glycol [molecular weight=35000]
(g-6): Distilled water
8. Heat stabilizer (a metal salt of an organic carboxylic acid, an alkaline earth metal salt) "h"
(h-1): Calcium 12-hydroxysrearate
(h-2): Magnesium stearate
(h-3): Ionomer [manufactured by Du Pont-Mitsui Polychemicals Co., "Himilan 1702"]
(h-4): Magnesium oxide
(h-5): Calcium citrate
(h-6): Calcium acetate
(h-7): Calcium stearate
9. Heat stabilizer (basic nitrogen-containing compound) "i"
(i-1): Melamine
(i-2): Melamine-formaldehyde resin Formaldehyde (1.2 mol) was allowed to react with melamine (1 mol) in an aqueous solution at a pH of 8 and a temperature of 70° C. to give a melamine-formaldehyde resin, as a water-soluble early condensation product, without clouding the reaction system. Then, the reaction system was adjusted to pH 6.5 with stirring. The stirring was continued, and the melamine-formaldehyde resin was precipitated from the system. The precipitate was dried to give a particulate melamine-formaldehyde resin as a crude product. The particulate was washed with hot water (60° C.) for 30 minutes, and filtered. Then, the residual was washed with acetone, and dried to obtain a purified melamine-formaldehyde resin as a white powder.

(i-3): Cyanoguanidine
(i-4): Nylon 6-66-610
(i-5): Allantoin
(i-6): Masterbatchpellet containing 3% by weight of allantoin, which was prepared from the allantoin (i-5) and a polyacetal resin [manufactured by Polyplastics Co., Ltd., "DURACON M90-44"] by extrusion.
(i-7): Biurea
(i-8): Adipic dihydrazide
(i-9): Allantoin dihydroxyaluminum [manufactured by Kawaken Fine Chemicals Co., Ltd., "ALDA"]
(i-10): Nylon 66 (average particle size=3 μm)
(i-11): Sebacic dihydrazide
(i-12): Dodecane diacid dihydrazide
10. Other additive
(j-1): Polystyrene [manufactured by Toyo Styrene Co., Ltd., "TOYO STYROL G19"]
(j-2): Acrylic core-shell polymer [manufactured by Takeda Chemical Industries, Ltd., "STAPHYLOID PO"]
(j-3): Thermoplastic polyurethane [manufactured by Nippon Mirastran Co., Ltd., "MIRACTRAN E"]
(j-4): Glass fiber [chopped strand being 9 μm in diameter and 3 mm long]

TABLE 1

| | Examples | | | | | | | | |
|---|---|---|---|---|---|---|---|---|---|
| | 1 | 2 | 3 | 4 | 5 | 6 | 7 | 8 | 9 |
| Polyacetal resin "a" | a-1 | a-1 | a-1 | a-1 | a-1 | a-1 | a-1 | a-1 | a-1 |
| (parts by weight) | 100 | 100 | 100 | 100 | 100 | 100 | 100 | 100 | 100 |
| Antioxidant "b" | b-1 | b-1 | b-2 | b-1 | b-1 | b-1 | b-1 | b-1 | b-1 |
| (parts by weight) | 0.3 | 0.3 | 0.3 | 0.3 | 0.3 | 0.3 | 0.3 | 0.3 | 0.3 |
| Guanamine compound "c" | c-1 | c-2 | c-2 | c-3 | c-4 | c-5 | c-6 | c-7 | c-8 |
| (parts by weight) | 0.3 | 0.3 | 0.3 | 0.3 | 0.3 | 0.3 | 0.3 | 0.3 | 0.3 |
| Weather (light)-resistant stabilizer (parts by weight) | — | — | — | — | — | — | — | — | — |
| Coloring agent "f" (parts by weight) | — | — | — | — | — | — | — | — | — |
| Processing stabilizer "g" (parts by weight) | g-1 | g-1 | g-2 | g-1 | g-1 | g-1 | g-1 | g-1 | g-1 |
| | 0.2 | 0.2 | 0.2 | 0.2 | 0.2 | 0.2 | 0.2 | 0.2 | 0.2 |
| Heat stabilizer | h-1 | h-1 | h-2 | h-1 | h-1 | h-1 | h-1 | h-1 | h-4 |
| (parts by weight) | 0.1 | 0.1 | 0.1 | 0.1 | 0.1 | 0.1 | 0.1 | 0.1 | 0.1 |
| Mold deposit 1000 shot | 1 | 1 | 1 | 1 | 1 | 1 | 1 | 1 | 1 |
| Amount of formaldehyde emission, Dry (μg/cm$^2$) | 0.7 | 0.7 | 0.7 | 0.7 | 0.8 | 0.8 | 1.1 | 0.7 | 0.6 |
| Blooming property | A | A | A | A | A | A | A | A | A |

| | Examples | | | | | | | |
|---|---|---|---|---|---|---|---|---|
| | 10 | 11 | 12 | 13 | 14 | 15 | 16 | 17 |
| Polyacetal resin "a" | a-1 | a-2 | a-2 | a-1 | a-1 | a-1 | a-1 | a-1 |
| (parts by weight) | 100 | 100 | 100 | 100 | 100 | 100 | 100 | 100 |
| Antioxidant "b" | b-3 | b-1 | b-1 | b-1 | b-1 | b-1 | b-1 | b-1 |
| (parts by weight) | 0.3 | 0.1 | 0.3 | 0.3 | 0.3 | 0.3 | 0.3 | 0.3 |
| Guanamine compound "c" | c-2 | c-1 | c-2 | c-1 | c-2 | c-1 | c-1 | c-2 |
| (parts by weight) | 0.3 | 0.3 | 0.3 | 0.3 | 0.3 | 0.3 | 0.3 | 0.3 |
| Weather (light)-resistant stabilizer (parts by weight) | — | — | — | — | — | — | — | — |
| Coloring agent "f" (parts by weight) | — | — | — | — | — | — | — | f-1<br>0.5 |
| Processing stabilizer | g-1 | g-1 | g-1 | g-1 | g-2 | g-1 | g-3 | g-4 |

TABLE 1-continued

| "g" (parts by weight) | 0.2 | 0.2 | 0.2 | 0.2 | 0.2 | 0.2 | 0.2 | 0.2 |
|---|---|---|---|---|---|---|---|---|
| Heat stabilizer | h-1 | h-1 | h-2 | h-2 | h-3 | h-4 | h-1 | h-1 |
| (parts by weight) | 0.1 | 0.1 | 0.1 | 0.1 | 0.1 | 0.02 | 0.1 | 0.1 |
|  | — | — | — | i-1 | i-2 | i-3 | i-4 | i-1 |
|  |  |  |  | 0.03 | 0.03 | 0.03 | 0.03 | 0.05 |
| Mold deposit 1000 shot | 1 | 1 | 1 | 1 | 1 | 1 | 1 | 2 |
| Amount of formaldehyde emission, Dry (μg/cm$^2$) | 0.9 | 0.5 | 0.5 | 0.6 | 0.7 | 0.6 | 0.7 | 0.9 |
| Blooming property | A | A | A | A | A | A | A | A |

TABLE 2

|  | Examples |  |  |  |  |  |  |
|---|---|---|---|---|---|---|---|
|  | 18 | 19 | 20 | 21 | 22 | 23 | 24 |
| Polyacetal resin "a" | a-1 | a-1 | a-1 | a-2 | a-1 | a-1 | a-1 |
| (parts by weight) | 100 | 100 | 100 | 100 | 100 | 100 | 100 |
| Antioxidant "b" | b-2 | b-1 | b-1 | b-1 | b-1 | b-1 | b-1 |
| (parts by weight) | 0.03 | 0.03 | 0.03 | 0.03 | 0.03 | 0.03 | 0.03 |
| Guanamine compound "c" | c-2 | c-3 | c-1 | c-2 | c-3 | c-7 | c-1 |
| (parts by weight) | 0.3 | 0.3 | 0.3 | 0.3 | 0.3 | 0.3 | 0.3 |
| Weather (light)-resistant stabilizer | d-1 | d-2 | d-3 | d-3 | d-3 | d-3 | d-3 |
| (parts by weight) | 0.5 | 0.25 | 0.4 | 0.4 | 0.4 | 0.4 | 0.4 |
|  | — | e-1 | e-1 | e-1 | e-1 | e-1 | e-1 |
|  |  | 0.25 | 0.2 | 0.2 | 0.2 | 0.2 | 0.2 |
| Coloring agent "f" (parts by weight) | — | — | — | — | — | — | — |
| Processing stabilizer "g" | g-1 | g-1 | g-1 | g-1 | g-3 | g-1 | g-2 |
| (parts by weight) | 0.2 | 0.2 | 0.2 | 0.2 | 0.2 | 0.2 | 0.2 |
| Heat stabilizer | h-1 | h-1 | h-1 | h-1 | h-1 | h-1 | h-3 |
| (parts by weight) | 0.1 | 0.1 | 0.1 | 0.1 | 0.1 | 0.1 | 0.02 |
|  | — | — | — | — | — | — | i-1 |
|  |  |  |  |  |  |  | 0.03 |
| Mold deposit 1000 shot | 1 | 1 | 1 | 1 | 1 | 1 | 1 |
| Amount of formaldehyde emission, Dry (μg/cm$^2$) | 0.9 | 0.8 | 0.8 | 0.6 | 0.6 | 0.6 | 0.7 |
| Weather (light) resistance | 3 | 2 | 1 | 1 | 1 | 1 | 1 |
| Blooming property | A | A | A | A | A | A | A |

|  | Examples |  |  |  |  |  |  |
|---|---|---|---|---|---|---|---|
|  | 25 | 26 | 27 | 28 | 29 | 30 | 31 |
| Polyacetal resin "a" | a-1 | a-1 | a-1 | a-1 | a-1 | a-1 | a-1 |
| (parts by weight) | 100 | 100 | 100 | 100 | 100 | 100 | 100 |
| Antioxidant "b" | b-1 | b-1 | b-1 | b-1 | b-1 | b-1 | b-1 |
| (parts by weight) | 0.03 | 0.03 | 0.03 | 0.03 | 0.03 | 0.03 | 0.03 |
| Guanamine compound "c" | c-2 | c-3 | c-1 | c-1 | c-3 | c-1 | c-2 |
| (parts by weight) | 0.3 | 0.3 | 0.3 | 0.3 | 0.3 | 0.3 | 0.3 |
| Weather (light)-resistant stabilizer | d-3 | d-3 | d-3 | d-3 | d-3 | d-3 | d-3 |
| (parts by weight) | 0.4 | 0.4 | 0.4 | 0.4 | 0.4 | 0.4 | 0.4 |
|  | e-1 | e-1 | e-1 | e-1 | e-1 | e-1 | e-1 |
|  | 0.2 | 0.2 | 0.2 | 0.2 | 0.2 | 0.2 | 0.2 |
| Coloring agent "f" | — | — | — | f-1 | f-1 | f-2 | f-3 |
| (parts by weight) |  |  |  | 0.5 | 0.5 | 0.5 | 0.5 |
| Processing stabilizer "g" | g-4 | g-5 | g-1 | g-1 | g-1 | g-1 | g-1 |
| (parts by weight) | 0.2 | 0.2 | 0.2 | 0.2 | 0.2 | 0.2 | 0.2 |
| Heat stabilizer | h-4 | h-5 | h-6 | h-1 | h-1 | h-1 | h-1 |
| (parts by weight) | 0.02 | 0.1 | 0.1 | 0.1 | 0.1 | 0.1 | 0.1 |
|  | i-2 | i-3 | i-4 | i-1 | i-3 | i-1 | i-1 |
|  | 0.03 | 0.03 | 0.03 | 0.05 | 0.05 | 0.05 | 0.05 |
| Mold deposit 1000 shot | 1 | 1 | 1 | 2 | 2 | 2 | 2 |
| Amount of formaldehyde emission, Dry (μg/cm$^2$) | 0.8 | 0.8 | 0.8 | 0.7 | 0.6 | 0.9 | 0.8 |
| Weather (light) resistance | 1 | 1 | 1 | 1 | 1 | 1 | 1 |
| Blooming property | A | A | A | A | A | A | A |

TABLE 3

|  | Comparative Examples | | | | |
| --- | --- | --- | --- | --- | --- |
|  | 1 | 2 | 3 | 4 | 5 |
| Polyacetal resin "a" | a-1 | a-1 | a-1 | a-1 | a-1 |
| (parts by weight) | 100 | 100 | 100 | 100 | 100 |
| Antioxidant "b" | b-1 | b-1 | b-1 | b-1 | b-1 |
| (parts by weight) | 0.3 | 0.03 | 0.03 | 0.03 | 0.03 |
| Guanamine compound "c" | — | — | — | — | — |
| (parts by weight) |  |  |  |  |  |
| weather (light)-resistant stabilizer | — | — | d-3 | d-3 | d-3 |
| (parts by weight) |  |  | 0.4 | 0.4 | 0.4 |
|  |  |  | e-1 | e-1 | e-1 |
|  |  |  | 0.2 | 0.2 | 0.2 |
| Coloring agent "f" | — | — | — | — | — |
| (parts by weight) |  |  |  |  |  |

TABLE 3-continued

|  | Comparative Examples | | | | |
| --- | --- | --- | --- | --- | --- |
|  | 1 | 2 | 3 | 4 | 5 |
| Processing stabilizer "g" | g-1 | g-1 | — | g-1 | g-1 |
| (parts by weight) | 0.2 | 0.2 |  | 0.2 | 0.2 |
| Heat stabilizer | h-1 | h-1 | — | h-1 | h-1 |
| (parts by weight) | 0.1 | 0.1 |  | 0.1 | 0.1 |
|  | — | i-1 | — | — | i-1 |
|  |  | 0.3 |  |  | 0.3 |
| Mold deposit 1000 shot | 1 | 5 | 3 | 2 | 5 |
| Amount of formaldehyde emission, Dry (μg/cm$^2$) | 2.9 | 1.0 | 3.3 | 3.0 | 2.1 |
| Weather (light) resistance | 5 | 5 | 3 | 1 | 1 |
| Blooming property | A | C | B | A | C |

TABLE 4

|  | Examples | | | | | | | |
| --- | --- | --- | --- | --- | --- | --- | --- | --- |
|  | 32 | 33 | 34 | 35 | 36 | 37 | 38 | 39 |
| Polyacetal resin "a" | a-1 | a-3 | a-3 | a-1 | a-4 | a-4 | a-1 | a-5 |
| (parts by weight) | 100 | 100 | 100 | 100 | 100 | 100 | 100 | 100 |
| Guanamine compound "c" | — | — | — | — | — | — | — | — |
| (parts by weight) |  |  |  |  |  |  |  |  |
| Heat stabilizer "i" | i-5 | i-6 | i-7 | i-8 | i-6 | i-9 | i-5 | i-6 |
| (parts by weight) | 0.03 | 1.0 | 0.1 | 0.1 | 1.0 | 0.03 | 0.03 | 1.0 |
| Mold deposit 1000 shot | 1 | 1 | 2 | 2 | 1 | 1 | 1 | 1 |
| Amount of formaldehyde emission, Dry (μg/cm$^2$) | 0.2 | 0.2 | 0.4 | 0.3 | 0.2 | 0.2 | 0.3 | 0.3 |
| Blooming property | A | A | A | A | A | A | A | A |
| Weather (light) resistance 600 hours, weather meter | — | — | — | — | — | — | 1 | 1 |

|  | Examples | | | | | | |
| --- | --- | --- | --- | --- | --- | --- | --- |
|  | 40 | 41 | 42 | 43 | 44 | 45 | 46 |
| Polyacetal resin "a" | a-6 | a-1 | a-1 | a-1 | a-7 | a-7 | a-8 |
| (parts by weight) | 100 | 100 | 100 | 100 | 100 | 100 | 100 |
| Guanamine compound "c" | — | — | — | — | c-1 | c-7 | c-1 |
| (parts by weight) |  |  |  |  | 0.3 | 0.3 | 0.3 |
| Heat stabilizer "i" | i-5 | i-6 | i-7 | i-8 | i-5 | i-8 | i-5 |
| (parts by weight) | 0.03 | 1.0 | 0.1 | 0.1 | 0.03 | 0.1 | 0.03 |
| Mold deposit 1000 shot | 1 | 1 | 1 | 1 | 1 | 1 | 1 |
| Amount of formaldehyde emission, Dry (μg/cm$^2$) | 0.3 | 0.3 | 0.5 | 0.5 | 0.3 | 0.4 | 0.5 |
| Blooming property | A | A | A | A | A | A | A |
| Weather (light) resistance 600 hours, weather meter | 1 | 1 | 1 | 1 | — | — | 1 |

TABLE 5

|  | Examples | | | | | |
| --- | --- | --- | --- | --- | --- | --- |
|  | 47 | 48 | 49 | 50 | 51 | 52 |
| Polyacetal resin "a" | a-1 | a-9 | a-9 | a-9 | a-1 | a-2 |
| (parts by weight) | 100 | 100 | 100 | 100 | 100 | 100 |

TABLE 5-continued

| | | | | | | |
|---|---|---|---|---|---|---|
| Antioxidant "b" | b-1 | b-1 | b-1 | b-1 | b-1 | b-1 |
| (parts by weight) | 0.3 | 0.3 | 0.3 | 0.3 | 0.3 | 0.3 |
| Guanamine compound "c" | c-9 | c-1 | c-2 | c-1 | c-1 | c-2 |
| (parts by weight) | 0.3 | 0.03 | 0.03 | 0.03 | 0.05 | 0.1 |
| Weather (light)-resistant stabilizer | — | — | — | — | — | — |
| (parts by weight) | | | | | | |
| Coloring agent "f" (parts by weight) | — | — | — | — | — | — |
| Processing stabilizer "g" | g-4 | g-6 | g-2 | g-1 | g-4 | g-2 | g-1 |
| (parts by weight) | 0.1 | 2 | 0.2 | 0.2 | 0.03 | 0.2 | 0.2 |
| Heat stabilizer | h-5 | h-4 | h-2 | h-7 | — | h-1 |
| (parts by weight) | 0.1 | 0.03 | 0.03 | 0.03 | | 0.03 |
| | i-10 | i-5 | i-7 | i-11 | i-11 | i-12 |
| | 0.05 | 0.2 | 0.2 | 0.2 | 0.1 | 0.1 |
| Other additive "j" | — | — | — | — | — | — |
| Mold deposit, 1000 shot | 1 | 2 | 2 | 3 | 2 | 2 |
| Amount of formaldehyde emission, Dry (μg/cm²) | 0.5 | 0.3 | 0.2 | 0.2 | 0.2 | 0.1 |
| Amount of formaldehyde emission, Humid (μg/cm²) | 0.5 | 0.5 | 0.3 | 0.3 | 0.3 | 0.2 |
| Blooming property | A | B | A | B | B | B |
| Weather (light) resistance | — | — | — | — | — | — |

| | Examples | | | | Comparative Examples | | |
|---|---|---|---|---|---|---|---|
| | 53 | 54 | 55 | 56 | 6 | 7 | 8 |
| Polyacetal resin "a" | a-10 | a-9 | a-9 | a-9 | a-9 | a-9 | a-9 |
| (parts by weight) | 100 | 100 | 100 | 100 | 100 | 100 | 100 |
| Antioxidant "b" | b-1 | b-1 | b-1 | b-1 | b-1 | b-1 | b-1 |
| (parts by weight) | 0.3 | 0.3 | 0.3 | 0.03 | 0.3 | 0.3 | 0.3 |
| Guanamine compound "c" | c-2 | c-2 | c-2 | c-2 | — | — | — |
| (parts by weight) | 0.03 | 0.03 | 0.05 | 0.1 | | | |
| Weather (light)-resistant stabilizer | — | — | — | d-3 | — | — | — |
| (parts by weight) | | | | 0.4 | | | |
| | | | | e-1 | | | |
| | | | | 0.2 | | | |
| Coloring agent "f" | — | — | f-1 | f-1 | — | — | — |
| (parts by weight) | — | — | 0.5 | 0.5 | | | |
| Processing stabilizer "g" | g-4 | g-4 | g-5 | g-1 | g-4 | g-4 | g-4 |
| (parts by weight) | 0.03 | 0.03 | 0.5 | 0.2 | 0.1 | 0.03 | 0.03 |
| Heat stabilizer | h-7 | h-7 | h-1 | h-1 | h-7 | h-7 | h-7 |
| (parts by weight) | 0.03 | 0.03 | 0.03 | 0.1 | 0.03 | 0.03 | 0.03 |
| | i-11 | i-11 | i-10 | i-11 | i-11 | i-11 | i-11 |
| | 0.1 | 0.1 | 0.05 | 0.2 | 0.2 | 0.05 | 0.1 | 1.0 |
| Other additive "j" | — | — | — | — | — | — | — |
| Mold deposit, 1000 shot | 2 | 2 | 3 | 3 | 1 | 4 | 5 |
| Amount of formaldehyde emission, Dry (μg/cm²) | 0.1 | 0.1 | 0.08 | 0.3 | 3.8 | 1.6 | 0.03 |
| Amount of formaldehyde emission, Humid (μg/cm²) | 0.2 | 0.2 | 0.1 | 0.4 | 2.4 | 1.9 | 0.05 |
| Blooming property | B | B | B | B | A | B | C |
| Weather (light) resistance | — | — | — | 1 | — | — | — |

TABLE 6

| | Examples | | | | | | |
|---|---|---|---|---|---|---|---|
| | 57 | 58 | 59 | 60 | 61 | 62 | 63 |
| Polyacetal resin "a" | a-2 | a-1 | a-2 | a-9 | a-9 | a-1 | a-2 |
| (parts by weight) | 100 | 100 | 100 | 100 | 100 | 100 | 100 |
| Antioxidant "b" | b-1 | b-1 | b-1 | b-1 | b-1 | b-1 | b-1 |
| (parts by weight) | 0.03 | 0.03 | 0.03 | 0.03 | 0.03 | 0.3 | 0.3 |
| Guanamine compound "c" | c-2 | c-2 | c-1 | c-2 | c-2 | c-2 | c-1 |
| (parts by weight) | 0.03 | 0.3 | 0.1 | 0.1 | 0.1 | 0.3 | 0.1 |
| Weather (light)-resistant stabilizer | d-3 | d-3 | d-3 | d-3 | d-3 | — | — |
| | 0.4 | 0.4 | 0.4 | 0.4 | 0.4 | | |
| (parts by weight) | e-1 | e-1 | e-1 | e-1 | e-1 | — | — |
| | 0.2 | 0.2 | 0.2 | 0.2 | 0.2 | | |
| Coloring agent "f" | f-1 | — | — | — | f-1 | — | — |
| (parts by weight) | 0.5 | | | | 0.5 | | |
| Processing stabilizer "g" | g-4 | g-1 | g-1 | g-1 | g-1 | g-1 | g-1 |
| (parts by weight) | 0.03 | 0.2 | 0.2 | 0.2 | 0.2 | 0.2 | 0.2 |

TABLE 6-continued

| | | | | | | | |
|---|---|---|---|---|---|---|---|
| Heat stabilizer (parts by weight) | h-7 0.03 i-11 0.2 | h-1 0.1 — | h-4 0.03 i-5 0.2 | h-2 0.1 i-7 0.2 | h-7 0.03 i-11 0.2 | h-1 0.1 — | h-4 0.03 i-5 0.2 |
| Other additive "j" (parts by weight) | j-1 0.1 | j-2 5 | j-2 5 | j-2 5 | j-2 5 | j-3 15 | j-3 15 |
| Mold deposit, 1000 shot | 1 | 1 | 2 | 2 | 3 | 1 | 2 |
| Amount of formaldehyde emission, Humid (μg/cm²) | 0.5 | 0.7 | 0.5 | 0.4 | 0.5 | 0.6 | 0.4 |
| Blooming property | A | A | B | A | B | A | B |
| Weather (light) resistance | 1 | 1 | 1 | 1 | 1 | — | — |
| Impact resistance (kJ/m²) | — | 6.9 | 6.8 | 7.0 | 6.9 | 15.4 | 15.5 |

| | Examples | | | | Comparative Examples | | |
|---|---|---|---|---|---|---|---|
| | 64 | 65 | 66 | 67 | 9 | 10 | 11 |
| Polyacetal resin "a" (parts by weight) | a-9 100 | a-9 100 | a-1 100 | a-1 100 | a-1 100 | a-1 100 | a-1 100 |
| Antioxidant "b" (parts by weight) | b-1 0.3 | b-1 0.3 | b-1 0.3 | b-1 0.3 | b-1 0.03 | b-1 0.3 | b-1 0.3 |
| Guanamine compound "c" (parts by weight) | c-2 0.1 | c-2 0.1 | c-1 0.3 | c-2 0.3 | — | — | — |
| Weather (light)-resistant stabilizer (parts by weight) | — | — | — | — | d-3 0.4 e-1 0.2 | — | — |
| Coloring agent "f" (parts by weight) | — | — | — | — | — | — | — |
| Processing stabilizer "g" (parts by weight) | g-1 0.2 | g-1 0.2 | g-1 0.2 | g-1 0.2 | g-1 0.2 | g-1 0.2 | g-1 0.2 |
| Heat stabilizer (parts by weight) | h-4 0.03 i-7 0.2 | h-7 0.03 i-11 0.2 | h-1 0.1 — | h-7 0.03 i-11 0.2 | h-1 0.1 — | h-1 0.1 — | h-1 0.1 — |
| Other additive "j" (parts by weight) | j-3 15 | j-3 15 | j-4 33 | j-4 33 | j-2 5 | j-3 15 | j-4 33 |
| Mold deposit, 1000 shot | 2 | 2 | 1 | 2 | 3 | 3 | 3 |
| Amount of formaldehyde emission, Humid (μg/cm²) | 0.3 | 0.3 | 0.5 | 0.3 | 5.1 | 3.1 | 4.3 |
| Blooming property | A | A | A | A | A | A | A |
| Weather (light) resistance | — | — | — | — | 1 | — | — |
| Impact resistance (kJ/m²) | 15.3 | 15.2 | 9.9 | 9.4 | 6.7 | 15.5 | 9.9 |

It is apparent from Tables that, compared with the resin compositions of the Comparative Examples, the resin compositions of the Examples can improve moldability and external appearance of shaped articles because of a small amount of mold deposit and that of exudation of the additive(s) along with molding. Further, since the amount of formaldehyde emission is extremely small, circumferential environment can be drastically reformed, and in addition weather (light) resistance of shaped articles can be improved. Moreover, addition of the impact resistance improver also ensures to improve impact resistance.

The invention claimed is:

1. A polyacetal resin composition which comprises a polyacetal resin, an antioxidant, a guanamine compound, and at least one member selected from the group consisting of a processing stabilizer and a heat stabilizer,
   wherein the guanamine compound comprises a compound represented by the following formula (2):

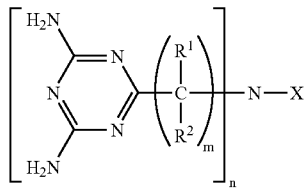

(2)

wherein $R^1$ and $R^2$ are the same or different and each represents a hydrogen atom or an alkyl group; "m" denotes an integer of not less than 2; the unit —N—X represents an amine residue which is a residue of a (poly)alkylenepolyamine, an imidazole compound, an isocyanuric acid, or a hydantoin compound; and "n" denotes an integer of 1 to 6, or a salt of the guanamine compound with a hydroxyl group-containing triazine compound,
   wherein the antioxidant comprises a hindered phenol-series compound and/or a hindered amine-series compound, and
   wherein the resin composition comprises 0.001 to 5 parts by weight of the antioxidant, 0.001 to 10 parts by weight of the guanamine compound or the salt thereof, 0.01 to 5 parts by weight of the processing stabilizer and/or 0.001 to 5 parts by weight of the heat stabilizer, each relative to 100 parts by weight of the polyacetal resin.

2. A polyacetal resin composition according to claim 1, wherein the amine compound corresponding to the amine residue represented by the unit —N—X is a (poly)alkylenepolyamine or an imidazole compound.

3. A polyacetal resin composition according to claim 1, wherein the guanamine compound is represented by the following formula (3) or (4):

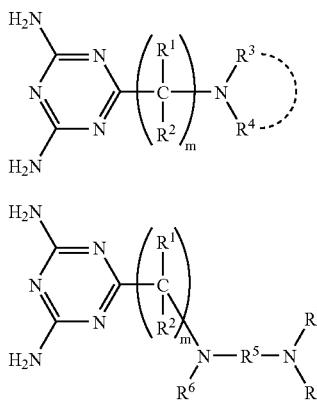

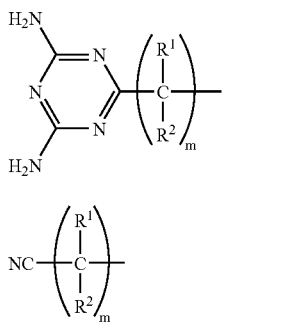

wherein $R^3$, $R^4$, and $R^6$, $R^7$ and $R^8$ are the same or different and each represents a hydrogen atom, an alkyl group, a cycloalkyl group, an aryl group, an aralkyl group, a carboxyalkyl group, an alkoxycarbonylalkyl group, an aryloxycarbonylalkyl group, or a guanamylalkyl group or cyanoalkyl group represented by the following formula (5a) or (5b):

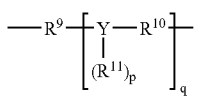

$R^3$ and $R^4$ may bond together with an adjacent nitrogen atom to form a hetero ring; $R^5$ represents an alkylene group, a divalent alicyclic group, a divalent aromatic group, or a divalent group represented by the following group (6):

$$—R^9—\left[\begin{array}{c}Y—R^{10}\\ |\\ (R^{11})_p\end{array}\right]_q—\quad(6)$$

wherein $R^9$ and $R^{10}$ are the same or different and each represents an alkylene group, and $R^{11}$ represents a hydrogen atom, a guanamylalkyl group of the formula (5a) or a cyanoalkyl group of the formula (5b), "Y" represents an oxygen atom or a nitrogen atom, "p" denotes 0 when "Y" is an oxygen atom and "p" denotes 1 when "Y" is a nitrogen atom, "q" denotes an integer of not less than 1;

$R^1$, $R^2$ and "m" have the same meanings defined above.

4. A polyacetal resin composition according to claim 1, wherein the guanamine compound has an imidazole residue.

5. A polyacetal resin composition according to claim 1 wherein the processing stabilizer comprises at least one member selected from the group consisting of a long-chain fatty acid or a derivative thereof, water and/or an alcohol, an organosiloxane, a fluorine-containing compound and a wax, and the heat stabilizer comprises at least one member selected from the group consisting of a basic nitrogen-containing compound, a metal salt of an organic carboxylic acid, an alkali or alkaline earth metal compound, a hydrotalcite, a zeolite and an acidic compound.

6. A polyacetal resin composition according to claim 5, wherein the basic nitrogen-containing compound comprises at least one member selected from the group consisting of biurea, allantoin, a metal salt of allantoin, a carboxylic acid hydrazide and a polyamide resin.

7. A polyacetal resin composition according to claim 5, wherein the basic nitrogen-containing compound is a carboxylic acid hydrazide or in the form of a resin master batch containing the carboxylic acid hydrazide, and the carboxylic acid hydrazide comprises at least one member selected from the group consisting of an aliphatic carboxylic acid hydrazide, and an aromatic carboxylic acid hydrazide.

8. A polyacetal resin composition according to claim 5, wherein the acidic compound is at least one member selected from the group consisting of a boric acid compound, a nitrogen-containing cyclic compound having a hydroxyl group, a carboxyl group-containing compound, a (poly)phenol, and an aminocarboxylic acid.

9. A polyacetal resin composition according to claim 1, which further comprises at least one additive selected from the group consisting of a weather (light)-resistant stabilizer, a coloring agent, a gloss control agent, an impact resistance improver, an agent for improving sliding property, and a filler.

10. A polyacetal resin composition according to claim 9, wherein the weather (light)-resistant stabilizer comprises at least one compound selected from the group consisting of a benzotriazole-series compound, a benzophenone-series compound, an aromatic benzoate-series compound, a cyanoacrylate-series compound, an oxalic anilide-series compound, and a hindered amine-series compound, and the coloring agent comprises a carbon black.

11. A polyacetal resin composition according to claim 9, wherein the contents of the weather (light)-resistant stabilizer and the coloring agent are 0.01 to 5 parts by weight respectively, relative to 100 parts by weight of the polyacetal resin.

12. A polyacetal resin-shaped article formed from a polyacetal resin composition recited in claim 1.

13. A polyacetal resin-shaped article according to claim 12, wherein, when the article is maintained in a closed space for 24 hours at a temperature of 80° C., the amount of formaldehyde generated from the article is not more than 1.5 μg per 1 cm² of surface area of the article.

14. A polyacetal resin-shaped article according to claim 12, wherein, when the article is maintained in a closed space for 3 hours at a temperature of 60° C. under a saturated humidity, the amount of formaldehyde generated from the article is not more than 2.5 μg per 1 cm² of surface area of the article.

15. A polyacetal resin-shaped article according to claim 12, which is at least one member selected from the group consisting of an automotive part, an electric electronic device part, an architectural pipeline part, a household utensil cosmetic article part, a medical device part, and a photographic part.

16. A process for producing a polyacetal resin-shaped article, which comprises molding a polyacetal resin composition recited in claim 1.

17. A process for producing a polyacetal resin composition which comprises mixing 100 parts by weight of a polyacetal resin, 0.001 to 5 parts by weight of an antioxidant, 0.001 to 10 parts by weight of a guanamine compound or a salt thereof, and 0.01 to 5 parts by weight of a processing stabilizer and/or 0.001 to 5 parts by weight of a heat stabilizer, wherein the guanamine compound comprises a compound represented by the following formula (2):

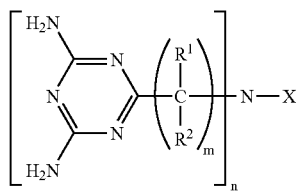

(2)

wherein $R^1$ and $R^2$ are the same or different and each represents a hydrogen atom or an alkyl group; "m" denotes an integer of not less than 2; the unit —N—X represents an amine residue which is a residue of a (poly)alkylenepolyamine, an imidazole compound, an isocyanuric acid, or a hydantoin compound; and "n" denotes an integer of 1 to 6, or a salt of the guanamine compound with a hydroxyl group-containing triazine compound, and wherein the antioxidant comprises a hindered phenol-series compound and/or a hindered amine-series compound.

* * * * *